US010856244B2

(12) United States Patent
Verma et al.

(10) Patent No.: US 10,856,244 B2
(45) Date of Patent: Dec. 1, 2020

(54) ORTHOGONAL MULTIPLEXING OF HIGH EFFICIENCY (HE) AND EXTREMELY HIGH THROUGHPUT (EHT) WIRELESS TRAFFIC

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/509,117

(22) Filed: Jul. 11, 2019

(65) Prior Publication Data
US 2020/0045656 A1    Feb. 6, 2020

Related U.S. Application Data

(60) Provisional application No. 62/714,016, filed on Aug. 2, 2018.

(51) Int. Cl.
*H04W 56/00*    (2009.01)
*H04J 3/06*    (2006.01)
(Continued)

(52) U.S. Cl.
CPC ........... *H04W 56/001* (2013.01); *H04J 3/067* (2013.01); *H04L 5/0044* (2013.01);
(Continued)

(58) Field of Classification Search
None
See application file for complete search history.

(56) References Cited

U.S. PATENT DOCUMENTS 9,844,049 B2 *  12/2017  Ghosh ..................... H04J 11/00
10,159,043 B1 *  12/2018  Cao ...................... H04L 27/2613
(Continued)

FOREIGN PATENT DOCUMENTS

EP          2557867 A1     2/2013
WO    WO-2016175439 A1    11/2016

OTHER PUBLICATIONS

International Search Report and Written Opinion—PCT/US2019/041681—ISA/EPO—dated Oct. 21, 2019.

*Primary Examiner* — Otis L Thompson, Jr.
(74) *Attorney, Agent, or Firm* — Holland & Hart LLP/Qualcomm

(57) ABSTRACT

This disclosure provides systems, methods, apparatus, including computer programs encoded on computer storage media for orthogonal multiplexing of high efficiency (HE) and extremely high throughput (EHT) wireless traffic. Devices in a wireless local area network (WLAN) may operate under HE or EHT conditions. An access point (AP) may support both HE and EHT communications with WLAN devices. To enable substantially simultaneous downlink HE and EHT transmissions and substantially simultaneous uplink HE and EHT transmissions, the AP may support orthogonal frequency-division multiple access (OFDMA) of HE and EHT transmissions. For example, pre-HE and pre-EHT modulated fields, HE and EHT modulated fields, and payloads may be aligned in time for the HE and EHT transmissions. The AP may ensure orthogonality for multiplexing the HE and EHT transmissions based on the alignment. In some implementations, a trigger frame may be utilized to indicate uplink transmission alignments.

24 Claims, 14 Drawing Sheets

(51) Int. Cl.
  *H04L 27/26* (2006.01)
  *H04L 5/00* (2006.01)
  *H04L 29/06* (2006.01)
  *H04W 88/08* (2009.01)

(52) U.S. Cl.
  CPC .......... *H04L 27/2605* (2013.01); *H04L 69/28* (2013.01); *H04W 88/08* (2013.01)

(56) References Cited

U.S. PATENT DOCUMENTS

| | | | |
|---|---|---|---|
| 2016/0007325 A1 | 1/2016 | Seok | |
| 2016/0128057 A1* | 5/2016 | Seok | H04L 1/0045 370/329 |
| 2016/0249397 A1* | 8/2016 | Seok | H04W 74/0808 |
| 2016/0315675 A1* | 10/2016 | Seok | H04B 7/0452 |
| 2016/0360443 A1 | 12/2016 | Hedayat | |
| 2016/0380794 A1* | 12/2016 | Sun | H04L 27/2602 370/328 |
| 2018/0160429 A1* | 6/2018 | Seok | H04L 1/0045 |
| 2019/0097850 A1* | 3/2019 | Kenney | H04L 27/2613 |
| 2019/0199491 A1* | 6/2019 | Verma | H04L 5/0032 |
| 2020/0036618 A1* | 1/2020 | Asterjadhi | H04W 24/02 |
| 2020/0037288 A1* | 1/2020 | Huang | H04L 1/188 |
| 2020/0177425 A1* | 6/2020 | Chen | H04L 27/2602 |

* cited by examiner

ORTHOGONAL MULTIPLEXING OF HIGH EFFICIENCY (HE) AND EXTREMELY HIGH THROUGHPUT (EHT) WIRELESS TRAFFIC

CROSS REFERENCE

The present Application for Patent claims benefit of U.S. Provisional Patent Application No. 62/714,016 by VERMA et al., entitled "ORTHOGONAL MULTIPLEXING OF HIGH EFFICIENCY (HE) AND EXTREMELY HIGH THROUGHPUT (EHT) WIRELESS TRAFFIC," filed Aug. 2, 2018, assigned to the assignee hereof, and expressly incorporated by reference in its entirety.

TECHNICAL FIELD

The following relates generally to wireless communication, and particularly to orthogonal multiplexing of high efficiency (HE) and extremely high throughput (EHT) wireless traffic.

DESCRIPTION OF THE RELATED TECHNOLOGY

Wireless communications systems are widely deployed to provide various types of communications content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network may include access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at an access point (AP). The method can include aligning a set of first pre-modulated fields of a first preamble physical protocol data unit (PPDU) portion in time with a set of second pre-modulated fields of a second preamble PPDU portion, where the first pre-modulated fields and the second pre-modulated fields each include one or more of pre-high efficiency (HE) modulated fields or pre-extremely high throughput (EHT) modulated fields, and the first preamble PPDU portion and the second preamble PPDU portion each include one or more of an HE preamble PPDU portion or an EHT preamble PPDU portion. The method can include aligning a set of first modulated fields of the first preamble PPDU portion in time with a set of second modulated fields of the second preamble PPDU portion, where the first modulated fields and the second modulate fields each include one or more of HE modulated fields or EHT modulated fields. The method can include transmitting the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion.

Another innovative aspect of the subject matter described in this disclosure can be implemented in an apparatus for wireless communications at an AP. The apparatus can include a first interface and a processing system. The processing system may be configured to align a set of first pre-modulated fields of a first preamble PPDU portion in time with a set of second pre-modulated fields of a second preamble PPDU portion, where the first pre-modulated fields and the second pre-modulated fields each include one or more of pre-HE modulated fields or pre-EHT modulated fields, and the first preamble PPDU portion and the second preamble PPDU portion each include one or more of an HE preamble PPDU portion or an EHT preamble PPDU portion. The processing system may be configured to align a set of first modulated fields of the first preamble PPDU portion in time with a set of second modulated fields of the second preamble PPDU portion, where the first modulated fields and the second modulate fields each include one or more of HE modulated fields or EHT modulated fields. The processing system may be configured to output, over the first interface for transmission to a wireless device, the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion.

Another innovative aspect of the subject matter described in this disclosure can be implemented in an apparatus for wireless communications at an AP. The apparatus can include means for aligning a set of first pre-modulated fields of a first preamble PPDU portion in time with a set of second pre-modulated fields of a second preamble PPDU portion, where the first pre-modulated fields and the second pre-modulated fields each include one or more of pre-HE modulated fields or pre-EHT modulated fields, and the first preamble PPDU portion and the second preamble PPDU portion each include one or more of an HE preamble PPDU portion or an EHT preamble PPDU portion. The apparatus can include means for aligning a set of first modulated fields of the first preamble PPDU portion in time with a set of second modulated fields of the second preamble PPDU portion, where the first modulated fields and the second modulate fields each include one or more of HE modulated fields or EHT modulated fields. The apparatus can include means for transmitting the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion.

Another innovative aspect of the subject matter described in this disclosure can be implemented in a non-transitory computer readable medium for wireless communications at an AP. The code can include instructions executable by a processor to align a set of first pre-modulated fields of a first preamble PPDU portion in time with a set of second pre-modulated fields of a second preamble PPDU portion, where the first pre-modulated fields and the second pre-modulated fields each include one or more of pre-HE modulated fields or pre-EHT modulated fields, and the first preamble PPDU portion and the second preamble PPDU portion each include one or more of an HE preamble PPDU portion or an EHT preamble PPDU portion. The code can include instructions executable by a processor to align a set of first modulated fields of the first preamble PPDU portion in time with a set of second modulated fields of the second preamble PPDU portion, where the first modulated fields and the second modulate fields each include one or more of HE modulated fields or EHT modulated fields. The code can include instructions executable by a processor to transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion.

In some implementations, the method, apparatuses, and non-transitory computer-readable medium may include padding a signal B (SIG-B) field of the first preamble PPDU portion or the second preamble PPDU portion such that a duration of the set of first pre-modulated fields of the first preamble PPDU portion may be the same as a duration of the set of second pre-modulated fields of the second preamble PPDU portion.

In some implementations, the method, apparatuses, and non-transitory computer-readable medium may include aligning the set of first modulated fields of the first preamble PPDU portion in time with the set of second modulated fields of the second preamble PPDU portion further may include operations, features, means, or instructions for aligning a payload of the first preamble PPDU portion in time with a payload of the second preamble PPDU portion.

In some implementations, the method, apparatuses, and non-transitory computer-readable medium may include aligning the payload of the first preamble PPDU portion in time with the payload of the second preamble PPDU portion includes padding one or more of the payload of the first preamble PPDU portion or the payload of the second preamble PPDU portion.

In some implementations of the method, apparatuses, and non-transitory computer-readable medium described herein, the first preamble PPDU portion and the second preamble PPDU portion include one or more of an equal number of long training fields, a same orthogonal frequency-division multiplexing (OFDM) symbol duration, or a same guard interval (GI) duration.

In some implementations of the method, apparatuses, and non-transitory computer-readable medium described herein, a number of long training fields of the first preamble PPDU portion may be different from a number of long training fields of the second preamble PPDU portion, and the long training fields of the first preamble PPDU portion or the second preamble PPDU portion use a same OFDM symbol duration and a same GI duration as a payload of the first preamble PPDU portion or the second preamble PPDU portion.

Another innovative aspect of the subject matter described in this disclosure can be implemented in a method for wireless communications at an AP. The method can include transmitting a trigger frame over a total bandwidth of the AP and receiving, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. The first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion. The first pre-modulated fields and the second pre-modulated fields may each include one or more of pre-HE modulated fields or pre-EHT modulated fields, and the first modulated fields and the second modulate fields each include one or more of HE modulated fields or EHT modulated fields.

Another innovative aspect of the subject matter described in this disclosure can be implemented in an apparatus for wireless communications at an AP. The apparatus can include a first interface, a second interface, and a processing system. The processing system may be configured to output, over the first interface for transmission to a wireless device, a trigger frame over a total bandwidth of the AP and obtain over the second interface a transmission received in response to the trigger frame, the transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. The first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion. The first pre-modulated fields and the second pre-modulated fields may each include one or more of pre-HE modulated fields or pre-EHT modulated fields, and the first modulated fields and the second modulate fields each include one or more of HE modulated fields or EHT modulated fields.

Another innovative aspect of the subject matter described in this disclosure can be implemented in an apparatus for wireless communications at an AP. The apparatus can include means for transmitting a trigger frame over a total bandwidth of the AP and receiving, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. The first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion. The first pre-modulated fields and the second pre-modulated fields may each include one or more of pre-HE modulated fields or pre-EHT modulated fields, and the first modulated fields and the second modulate fields each include one or more of HE modulated fields or EHT modulated fields.

Another innovative aspect of the subject matter described in this disclosure can be implemented in a non-transitory computer readable medium for wireless communications at an AP. The code can include instructions executable by a processor to transmit a trigger frame over a total bandwidth of the AP and receive, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. The first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion. The first pre-modulated fields and the second pre-modulated fields may each include one or more of pre-HE modulated fields or pre-EHT modulated fields, and the first modulated fields and the second modulate fields each include one or more of HE modulated fields or EHT modulated fields.

In some implementations of the method, apparatuses, and non-transitory computer-readable medium described herein, the first preamble PPDU portion and the second preamble PPDU portion include one or more of an equal number of long training fields, a same OFDM symbol duration, or a same GI duration.

In some implementations of the method, apparatuses, and non-transitory computer-readable medium described herein, a number of long training fields of the first preamble PPDU portion may be different from a number of long training fields of the second preamble PPDU portion, and the long training fields of the first preamble PPDU portion or the second preamble PPDU portion use a same OFDM symbol duration and a same GI duration as a payload of the first preamble PPDU portion or the second preamble PPDU portion.

In some implementations of the method, apparatuses, and non-transitory computer-readable medium described herein, a payload of the first preamble PPDU portion may be aligned in time with a payload of the second preamble PPDU portion.

In some implementations, the method, apparatuses, and non-transitory computer-readable medium may include generating a per-user information field corresponding to each of a first wireless station associated with the first preamble PPDU portion and a second wireless station associated with the second preamble PPDU portion, where the per-user information field corresponding to the first wireless station may be equal in duration to the per-user information field corresponding to the second wireless station, and the per-user information field for each of the first wireless station and the second wireless station may be included in the trigger frame.

In some implementations of the method, apparatuses, and non-transitory computer-readable medium described herein, the per-user information field indicates spatial stream allocation information for each of the first wireless station and the second wireless station, and the spatial stream allocation information may be signaled in a combination of a spatial stream allocation subfield and one or more of an uplink forward error correction coding type subfield, an uplink dual carrier modulation subfield, or a reserved subfield.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
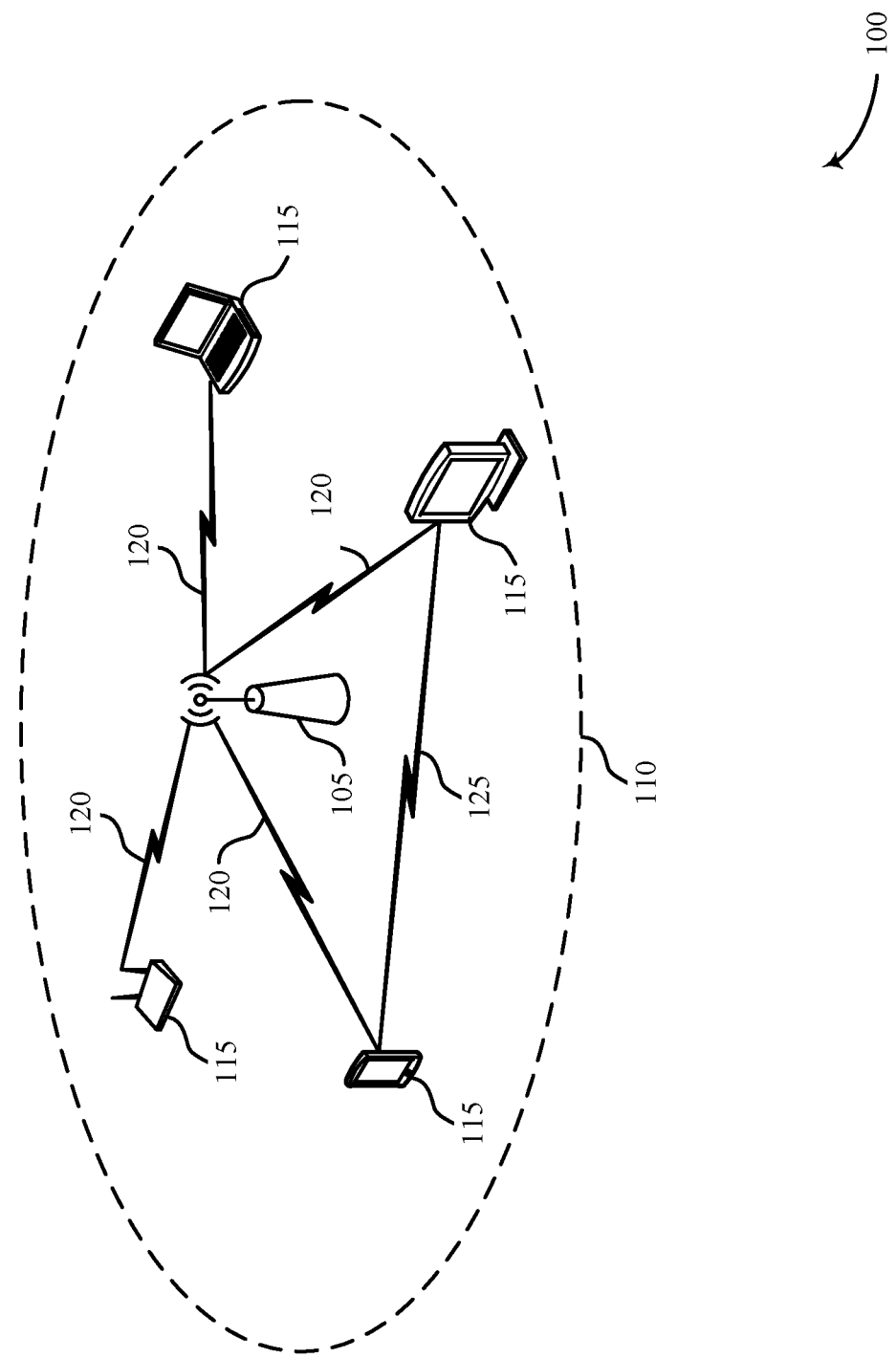
FIG. 1 shows an example of a wireless local area network (WLAN) that supports orthogonal multiplexing of high efficiency (HE) and extremely high throughput (EHT) wireless traffic.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code-division multiple access (CDMA), frequency-division multiple access (FDMA), time-division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone Service (AMPS), or other known signals that are used to communicate within a wireless, cellular or internet of things (IOT) network, such as a system utilizing 3G, 4G or 5G, or further implementations thereof, technology.

Techniques are disclosed for orthogonal multiplexing of high efficiency (HE) and extremely high throughput (EHT) wireless traffic. HE and EHT systems may support coverage for multiple types of mobile stations (STAs). For example, an access point (AP) in an EHT system may support coverage for HE and EHT STAB (such as HE and EHT devices). In some systems, both HE and EHT devices may coexist, and the HE and EHT devices may support orthogonal frequency-division multiple access (OFDMA). In some implementations, however, the HE and EHT devices may support different system bandwidths. OFDMA may enable simultaneous transmissions to both HE and EHT devices, where OFDMA transmissions may rely on orthogonality between transmissions. The techniques disclosed in this paper enable the time alignment of analogous portions of HE and EHT transmissions such that orthogonality between the two types of transmissions may be maintained.

In some implementations, a non-duplicate preamble may be either an HE or EHT preamble. To achieve orthogonality between simultaneous OFDMA HE and EHT transmissions, pre-HE-modulated and pre-EHT-modulated fields for one or more portions of a physical protocol data unit (PPDU) bandwidth may be aligned in time, and HE-modulated and EHT-modulated fields for each PPDU portion of the PPDU bandwidth may be aligned in time. In some implementations, different fields in both HE and EHT preambles may use a same symbol duration (such as a 4 μs orthogonal frequency-division multiplexing (OFDM) symbol duration). For example, a legacy short training field (L-STF), a legacy long training field (L-LTF), a legacy signal (L-SIG) field, a repeated L-SIG (RL-SIG) field, an HE signal A (SIG-A) field/EHT SIG-A, and an HE signal B (SIG-B)/EHT SIG-B may use the symbol duration. However, in some implementations, the number of HE SIG-B and EHT SIG-B symbols may differ between the different preambles (such as HE and EHT preambles). As such, there may be a possibility of that pre-HE modulated fields and pre-EHT modulated fields are misaligned based on, for example, a different number of SIG-B symbols for each preamble. To ensure time-alignment of the pre-HE and pre-EHT-modulated fields of the respective HE and EHT preambles, padding of HE SIG-B fields and EHT SIG-B fields may be used such that if a different number of SIG-B symbols are used, they appear to be the same duration.

In some implementations, the HE and EHT modulated fields may be aligned in time by ensuring that each PPDU portion contains a same number of HE and EHT long training fields (LTFs) with the same durations of LTFs and guard intervals (GIs). For example, a duration of each OFDM symbol without a GI in HE LTFs may be the same as a duration of each OFDM symbol without GI in EHT LTFs, and a GI duration of HE LTFs may be the same as a GI duration of EHT LTFs. Additionally, HE and EHT short training fields (STFs) may have the same duration. The HE and EHT modulated fields may be aligned, where each PPDU portion may contain a different number of HE and EHT LTFs. In some implementations, each HE/EHT LTF and GI may have a same duration as a payload (such as data) portion. For example, a duration of each OFDM symbol without a GI in an HE data field may be the same as a duration of each OFDM symbol without a GI in an EHT data field (such as 12.8 μs), and a duration of a GI in the data field may be the same as a duration of a GI in the EHT data field (such as 0.8/1.6/3.2 μs). Similarly, a duration of each OFDM symbol without a GI in an HE LTF may be the same as a duration of each OFDM symbol without a GI in an EHT LTF (such as 12.8 μs), and a duration of a GI may be the same in any of an HE LTF, an EHT LTF, and an HE/EHT data field. Additionally, or alternatively, each payload also may be aligned in the PPDU portions through padding.

For uplink OFDMA of both HE and EHT transmissions, a trigger frame may be transmitted to trigger uplink HE and EHT transmissions. In some implementations, the trigger frame may indicate to transmit an EHT preamble in addition to an HE preamble, where the HE preamble includes pre-EHT modulated fields instead of pre-HE modulated fields. Accordingly, an HE preamble PPDU portion and an EHT preamble PPDU portion may be received orthogonally. To support the orthogonality, pre-EHT modulated fields may be aligned in a trigger-based PPDU for each resource unit (RU), HE and EHT modulated fields may be aligned in the trigger-based PPDU on each RU, and payloads may be aligned in the trigger-based PPDU by padding. Additionally, the trigger frame may include a per-user field for STAs associated with each HE and EHT PPDU portion. The per-user field may allocate spatial streams for each HE and EHT device, and the per-user field may have an equal duration for each HE or EHT device (such as a client device).

Particular implementations of the subject matter described in this disclosure can be implemented to realize one or more of the following potential advantages. Specifically, the proposed techniques allow for increased potential at an AP. For example, downlink transmissions from the AP to one or more STAs may utilize different preambles (such as HE and EHT preambles) for simultaneous transmissions. Additionally, uplink transmissions from one or more STAs to the AP may be received for both HE and EHT STAs simultaneously. In some implementations, the use of higher bandwidths (such as 320 MHz) may be improved based on the multiplexing of both HE and EHT devices.

FIG. 1 shows a wireless local area network (WLAN) 100 (also known as a Wi-Fi network) that supports orthogonal multiplexing of HE and EHT wireless traffic. The WLAN 100 may include an AP 105 and multiple associated STAs 115, which may represent devices such as mobile stations, personal digital assistant (PDAs), other handheld devices, netbooks, notebook computers, tablet computers, laptops, display devices (such as TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The WLAN 100 may include APs 105 of different types (such as metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. The STAs 115 and the APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, 802.11-EHT, etc. In some other implementations, peer-to-peer connections or ad hoc networks may be implemented within the WLAN 100.

In some implementations, STAs 115 of WLAN 100 may operate under either HE or EHT conditions. As such, an AP 105 may support both HE and EHT communications with respective HE and EHT STAs 115. However, HE and EHT transmissions may not be compatible for simultaneous transmissions. For example, HE transmissions may be longer in duration than EHT transmissions. To enable simultaneous downlink HE and EHT transmissions and receiving simultaneous uplink HE and EHT transmissions, the AP 105 may support OFDMA of both HE and EHT downlink/uplink transmissions. For example, pre-HE and pre-EHT-modulated fields, HE and EHT modulated fields, and payloads for both the HE and EHT transmissions may be aligned in time. In some implementations, a trigger frame may be utilized for indicating the alignments for uplink transmissions. Accordingly, the AP 105 may ensure OFDM orthogonality for both the HE and EHT transmissions.

Figure 2:
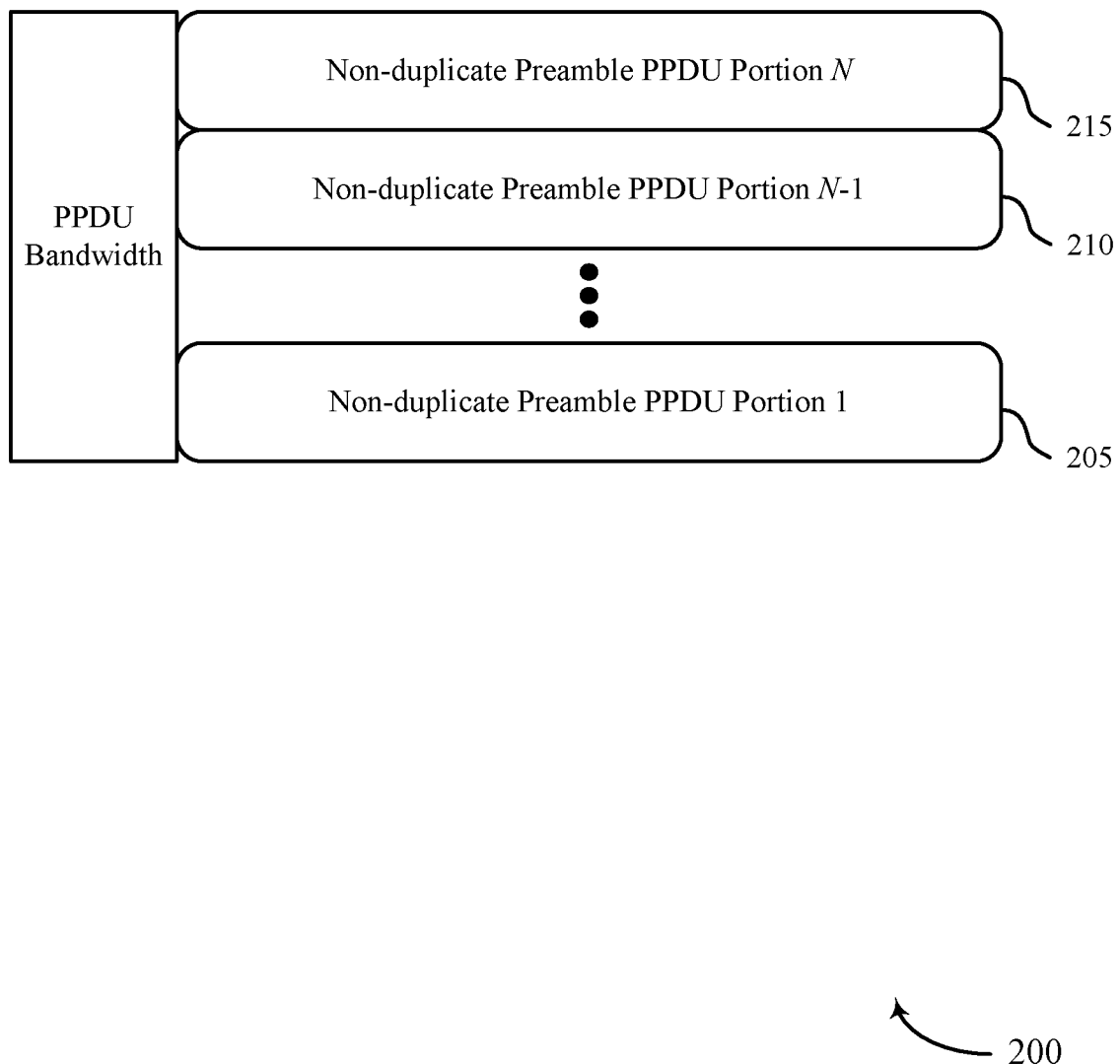
FIG. 2 shows example portions of a physical protocol data unit (PPDU) bandwidth that support orthogonal multiplexing of HE and EHT wireless traffic.

FIG. 2 shows example portions of a PPDU bandwidth 200 that support orthogonal multiplexing of HE and EHT wireless traffic. The PPDU bandwidth 200 may include a number N portions of a non-duplicate preamble PPDU transmission. For example, as shown in FIG. 2, the PPDU bandwidth 200 may include a first non-duplicate preamble PPDU portion 1 (205), a second non-duplicate preamble PPDU portion N−1 (210), and a third (that is, Nth) non-duplicate preamble PPDU portion N (215).

In an illustrative example, the PPDU bandwidth 200 may be 160 MHz. In various implementations, a bandwidth of each of the non-duplicate preamble PPDU portions may be one of 20, 40, 80, or 160 MHz, where the sum of the non-duplicate preamble PPDU portions may be the 160 MHz of the PPDU bandwidth 200. Alternatively, in some implementations, the PPDU bandwidth 200 may be 320 MHz, and the sum of the non-duplicate preamble PPDU portions may be 320 MHz.

In some implementations, non-duplicate preambles may be non-identical (for example, some or all of the preambles being different), and the bandwidth of each of the non-duplicate preamble PPDU portions may be different, that is, each portion may have non-identical bandwidths. For example, the bandwidth of each of the first non-duplicate preamble PPDU portion 1 (205), the second non-duplicate preamble PPDU portion N−1 (210), and the third (that is, Nth) non-duplicate preamble PPDU portion N (215) may be different (for example, having bandwidths of 20, 40, and 80 MHz, respectively).

In some implementations, a non-duplicate preamble may be either an HE or EHT preamble. To achieve orthogonality between simultaneous or substantially simultaneous HE and EHT transmissions (such as OFDMA HE and EHT transmissions), pre-HE-modulated and pre-EHT-modulated fields for each portion of the PPDU bandwidth 200 may be aligned in time. As described herein, the non-duplicate preamble PPDU portions are described as "non-duplicate" in that the preamble portions are not copied or duplicated from the other portions, and the pre-modulated fields (such as pre-HE-modulated and pre-EHT modulated fields) of each of the non-duplicate preamble PPDU portions may different from one another. Following the pre-HE modulated and pre-HE-modulated fields, HE-modulated and EHT-modulated fields for each PPDU portion of the PPDU bandwidth 200 may be aligned in time. In some implementations, a spectral mask for the PPDU bandwidth 200 may be met by the composite transmission of the non-duplicate preamble PPDU portions.

Figure 3A:
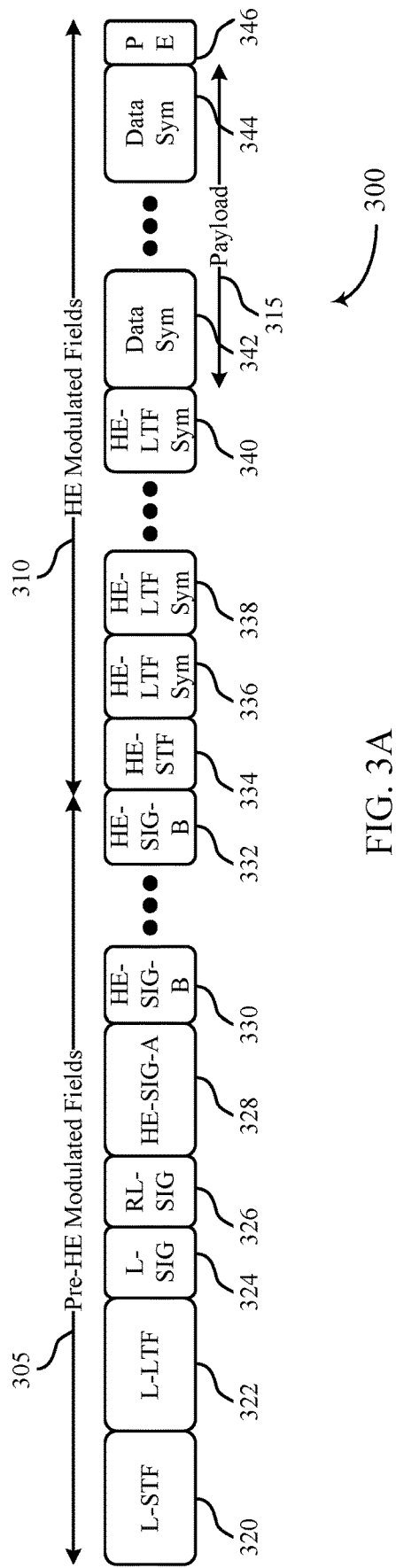
FIGS. 3A and 3B show example downlink field alignments for HE PPDU fields and EHT PPDU fields, respectively, that support orthogonal multiplexing of HE and EHT wireless traffic.
Figure 3B:
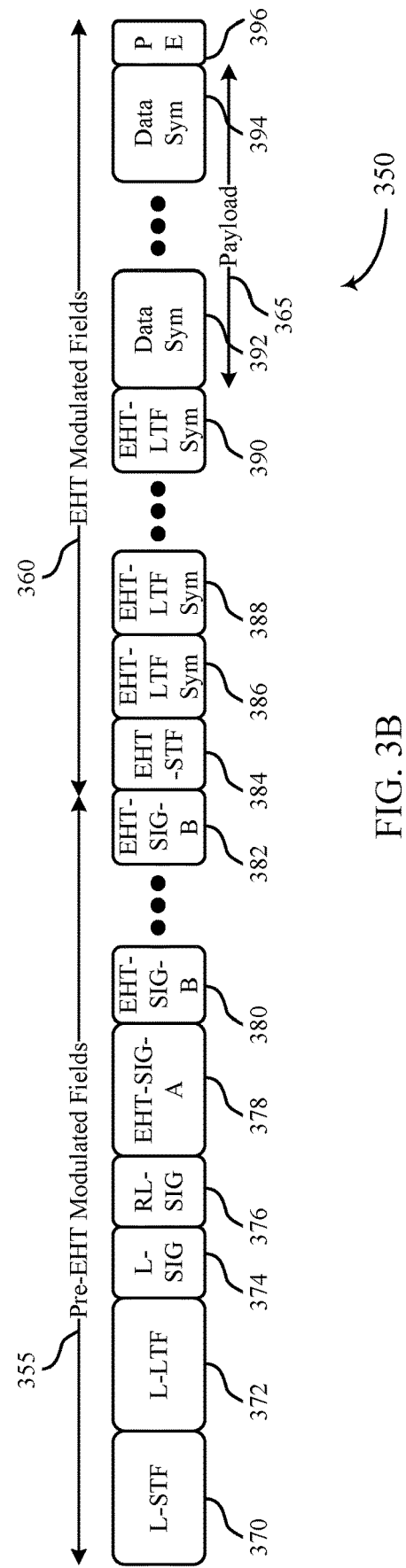

FIGS. 3A and 3B show example downlink field alignments 300 and 350 for HE PPDU fields and EHT PPDU fields, respectively, that support orthogonal multiplexing of HE and EHT wireless traffic. The example downlink field alignment 300 shows a configuration of a number of HE PPDU fields for an HE transmission, and the example downlink field alignment 350 shows a configuration of a number of EHT PPDU fields for an EHT transmission. In some implementations, the downlink field alignment 300 and the downlink field alignment 350 may correspond to HE and EHT transmissions using two distinct spatial transmissions streams. In some implementations, the downlink field alignment 300 and the downlink field alignment 350 may implement aspects of the PPDU bandwidth 200, for example the non-duplicate preamble PPDU portions, as described with reference to FIG. 2. It is to be understood that while the techniques described herein may be described and illustrated with reference to HE transmissions and EHT transmissions on two respective spatial streams, the techniques may be implemented similarly for any combination of HE transmissions and EHT transmissions (for example, to configure HE transmission with respect to one or more additional HE transmissions, an EHT transmission with respect to one or more additional EHT transmissions, or any combination thereof).

As shown in FIG. 3A, the example downlink field alignment 300 includes a set of pre-HE modulated fields 305 and a set of HE modulated fields 310 for the HE transmission, where the HE modulated fields 310 may include a payload 315 (for example, a data payload). The pre-HE modulated fields 305 may include an L-STF 320, an L-LTF 322, an L-SIG field 324, an RL-SIG field 326, and an HE-SIG-A field 328 followed by a number of HE-SIG-B fields, shown from a first HE-SIG-B field 330 through a second HE-SIG-B field 332. The HE modulated fields 310 may include an HE-STF 334 followed by a number of HE-LTF symbols, shown as a first HE-LTF symbol 336, a second HE-LFT symbol 338, through a third HE-LFT symbol 340. Following the third HE-LTF symbol 340 (that is, the last HE-LTF symbol), the payload 315 in the HE modulated fields 310 may include a number of data symbols, shown as a first data symbol 342 through a second data symbol 344, and a packet extension (PE) field 346.

As shown in FIG. 3B, the example downlink field alignment 350 includes a set of pre-EHT modulated fields 355 and a set of EHT modulated fields 360 for the EHT transmission, where the EHT modulated fields 360 may include a payload 365 (for example, a data payload). The pre-EHT modulated fields 355 may include an L-STF 370, an L-LTF 372, an L-SIG field 374, an RL-SIG field 376, and an EHT-SIG-A field 378 followed by a number of EHT-SIG-B fields, shown from a first EHT-SIG-B field 380 through a second EHT-SIG-B field 382. The EHT modulated fields 360 may include an EHT-STF 384 followed by a number of EHT-LTF symbols, shown as a first EHT-LTF symbol 386, a second EHT-LFT symbol 388, through a third EHT-LFT symbol 390. Following the third EHT-LTF symbol 390 (that is, the last EHT-LTF symbol), the payload 365 in the EHT modulated fields 360 may include a number of data symbols, shown as a first data symbol 392 through a second data symbol 394, and a PE field 396.

To achieve orthogonality between simultaneous or substantially simultaneous HE and EHT transmissions (using, for example, OFDMA), symbol boundaries of the PPDU fields shown by the downlink field alignments 300 and 350 may be aligned in time. In some implementations, different fields of HE preambles and EHT preambles may have a same symbol duration, and a number of HE SIG-B symbols and EHT SIG-B symbols may differ between the HE and EHT preambles. Thus, in some such implementations, the pre-HE modulated fields 305 and the pre-EHT modulated fields 355 may be misaligned based on including different numbers of SIG-B symbols in each respective preamble. To ensure time-alignment of the pre-HE modulated fields 305 and the pre-EHT-modulated fields 355 of the respective HE and EHT preambles, in some implementations, padding may be added to one or both of the HE SIG-B fields and the EHT SIG-B fields of the respective preambles such that if different numbers of HE SIG-B symbols and EHT SIG-B symbols are used, the preambles may appear to have a same duration.

In some implementations, as shown in the downlink field alignments 300 and 350, the HE modulated fields 310 and the EHT modulated fields 360 may be aligned in time by configuring each PPDU portion to include a same number of HE-LTFs and EHT-LTFs (using timings such as 1×, 2×, 3×, or 4×LTF, etc.), where, for example, LTFs and GIs of each of the PPDU portions may be configured with a same duration (that is, identical or substantially identical). For example, the HE modulated fields 310 may be configured with a same number of HE-LTF symbols 336-340 as a number of EHT-LTF symbols 386-390 configured in the EHT modulated fields 360. Accordingly, a duration of each symbol (such as OFDM symbols) without a GI in the HE-LTF symbols 336-340 may have a same duration as each of the symbols without a GI in the EHT-LTF symbols 386-390. Similarly, a GI duration used for the HE-LTF symbols 336-340 may be the same as a GI duration used for the EHT-LTF symbols 386-390 (such as 0.8, 1.6, or 3.2 μs). In some implementations, HE-SFTs and EHT-STFs may have a same duration (that is, a duration of the HE-STF 334 may be the same as a duration of the EHT-STF 384).

Alternatively, in some implementations, the HE modulated fields 310 and the EHT modulated fields 360 may be aligned in time where different PPDU portions contain different numbers of HE-LTFs and EHT-LTFs (using a timing such as 4×LTFs). In some such implementations, the HE-LTFs and the EHT-LTFs, including any associated GIs, may have a same duration as a payload portion (for example, a data portion) of a corresponding HE or EHT transmission. For example, a duration of each data symbol 342-344 (such as OFDM symbols) without a GI of the HE modulated fields 310 (for example, HE data fields) may be the same as a duration of each data symbol 392-394 without a GI of the EHT modulated fields 360 (for example, EHT data fields) (such as 12.8 μs), and a duration of a GI in the HE data fields may be the same as a duration of a GI in the EHT data fields (such as 0.8, 1.6, or 3.2 μs). Similarly, a duration of each symbol without a GI of the HE-LTF symbols 336-340 may be the same as a duration of each symbol without a GI of the EHT-LTF symbols 386-390 (such as 12.8 μs), and a duration of a GI may be the same for any of the HE-LTF symbols 336-340, EHT-LTF symbols 386-390, HE data symbols 342-344, and EHT data symbols 392-394.

Additionally, or alternatively, in some implementations, each payload may be aligned in the PPDU portions through padding. For example, an AP may align the pre-HE modulated fields 305 with the pre-EHT modulated fields 355 by padding a SIG-B field (such as one or more of the HE-SIG-B fields 330-332) such that a duration of the pre-HE modulated fields 305 is the same as a duration of the pre-EHT modulated fields 355. In some implementations, the data symbols 342-344 of the HE modulated fields 310 and the data symbols 392-394 of the EHT modulated fields 360 may each include a discrete Fourier transform (DFT) period and a GI, where the DFT periods may have a same duration (such as 12.8 μs) and the GIs may have same duration (such as 0.8, 1.6, or 3.2 μs).

Example configurations for non-duplicate preamble PPDU portion transmissions are provided according to Tables 1 and 2 shown below. The configurations provided ion Tables 1 and 2 may be implemented according to the techniques described herein. It is to be understood that the configurations provided in Tables 1 and 2 are illustrative examples, and any number of other analogous configurations may be implemented similarly.

TABLE 1

I. 160 MHz PPDU Bandwidth for Non-duplicate Preamble PPDU Portions

| PPDU Bandwidth | Non-duplicate Preamble PPDU Portions | | |
|---|---|---|---|
| 160 MHz | 40 MHz HE Multi-User (MU) PPDU | 40 MHz HE MU PPDU | 80 MHz EHT MU PPDU |
| 160 MHz | 80 MHz HE MU PPDU | | 80 MHz EHT MU PPDU |

TABLE 2

320 MHz PPDU Bandwidth for Non-duplicate Preamble PPDU Portions

| PPDU Bandwidth | Non-duplicate Preamble PPDU Portions | | | |
|---|---|---|---|---|
| 320 MHz | 80 MHz HE MU PPDU | 80 MHz HE MU PPDU | 80 MHz EHT MU PPDU | 80 MHz EHT MU PPDU |
| 320 MHz | 80 MHz HE MU PPDU | 80 MHz EHT MU PPDU | | 160 MHz EHT MU PPDU |
| 320 MHz | 160 MHz HE MU PPDU | | | 160 MHz EHT MU PPDU |

Figure 4:
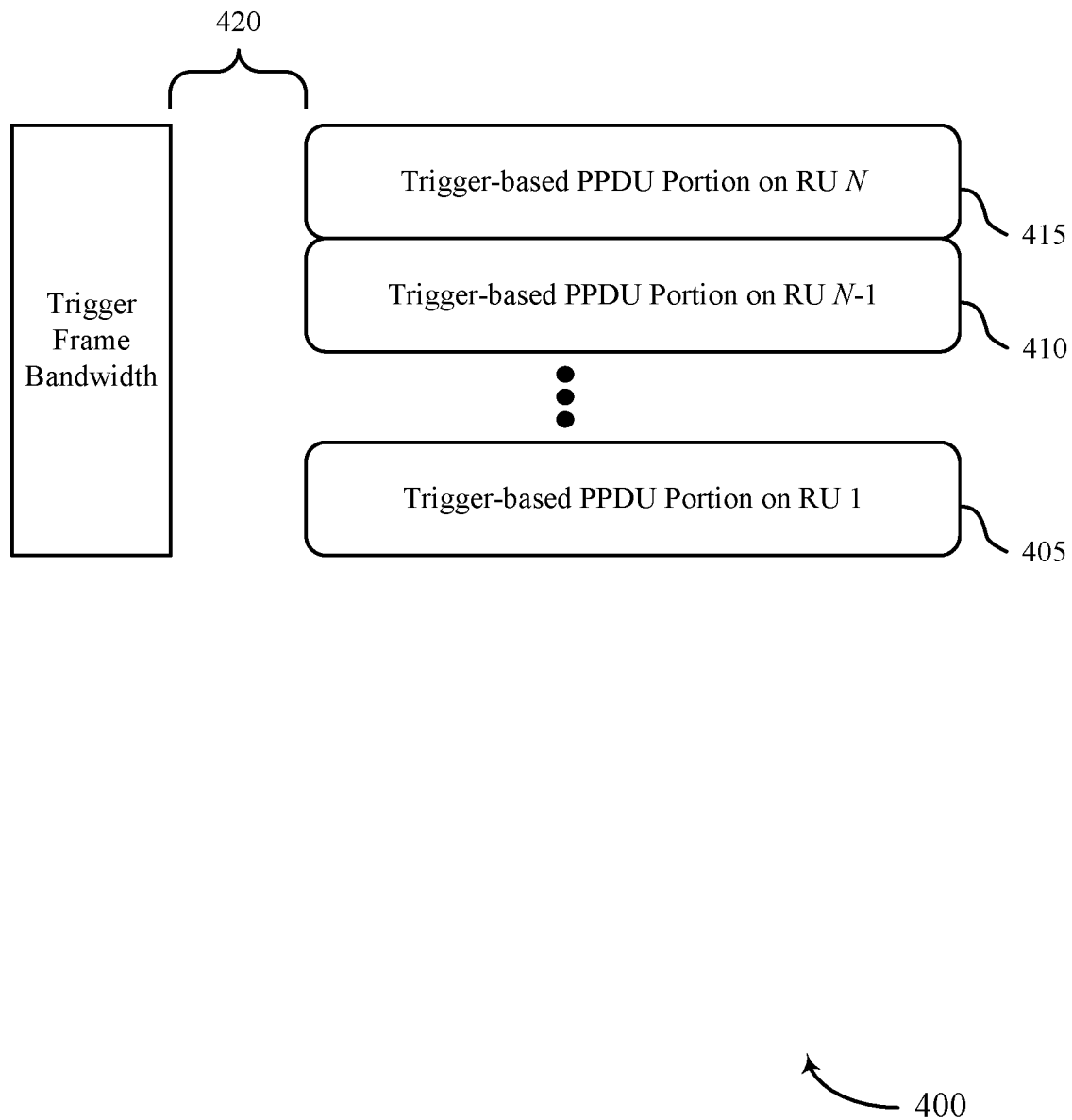
FIG. 4 shows an example of a trigger frame bandwidth that supports orthogonal multiplexing of HE and EHT wireless traffic.

FIG. 4 shows an example of a trigger frame bandwidth 400 that supports orthogonal multiplexing of HE and EHT wireless traffic. The trigger frame bandwidth 400 may include a number N RUs for trigger-based PPDUs of transmissions. For example, as shown in FIG. 4, the trigger frame bandwidth 400 may include a first trigger-based PPDU portion 405 on a first RU, a second trigger-based PPDU portion 410 on a N−1th RU, and a third (that is, Nth) trigger-based PPDU portion 415 on an Nth RU.

In some implementations, for communications HE and EHT, an AP may transmit a trigger frame to one or more wireless devices (such as one or more STAs) to trigger one or more uplink HE and EHT transmissions (for example, multiplexed using OFDMA). In some implementations, the trigger frame may include a common information field including configuration information common to each of the devices with which the AP is to communicate and a per-user (that is, user-specific) information field including configuration information specific to an individual STA associated with each HE and EHT PPDU portion. The common information field (for example, an HE-SIG-A Reserved field) may include common information particular for, for example, EHT. The per-user information field may allocate spatial streams for each HE and EHT device, and the per-user field may have an identical (or substantially identical) bit size for an equal (or substantially equal) duration for each HE or EHT device (such as each of one or more client devices).

In some implementations, the trigger frame may signal the transmission of an EHT preamble and an HE preamble, where the HE preamble may include pre-EHT modulated fields instead of pre-HE modulated fields. Accordingly, an HE preamble PPDU portion and an EHT preamble PPDU portion may be received orthogonally. To support the orthogonality, pre-EHT modulated fields may be aligned for the trigger-based PPDU portion for each corresponding RU, HE and EHT modulated fields may be aligned for the trigger-based PPDU portion for each corresponding RU, and payloads may be aligned in the trigger-based PPDU, for example, by padding one or more associated fields, as described herein. In some implementations, the trigger-based PPDU portion transmissions may follow a short interframe spacing (SIFS), during which the AP and STAs may process received transmissions before transmitting subsequent communications. In some implementations, a spectral mask for each of the RUs of trigger frame bandwidth 400 may be met by the composite transmission of the trigger-based PPDUs portions.

Figure 5A:
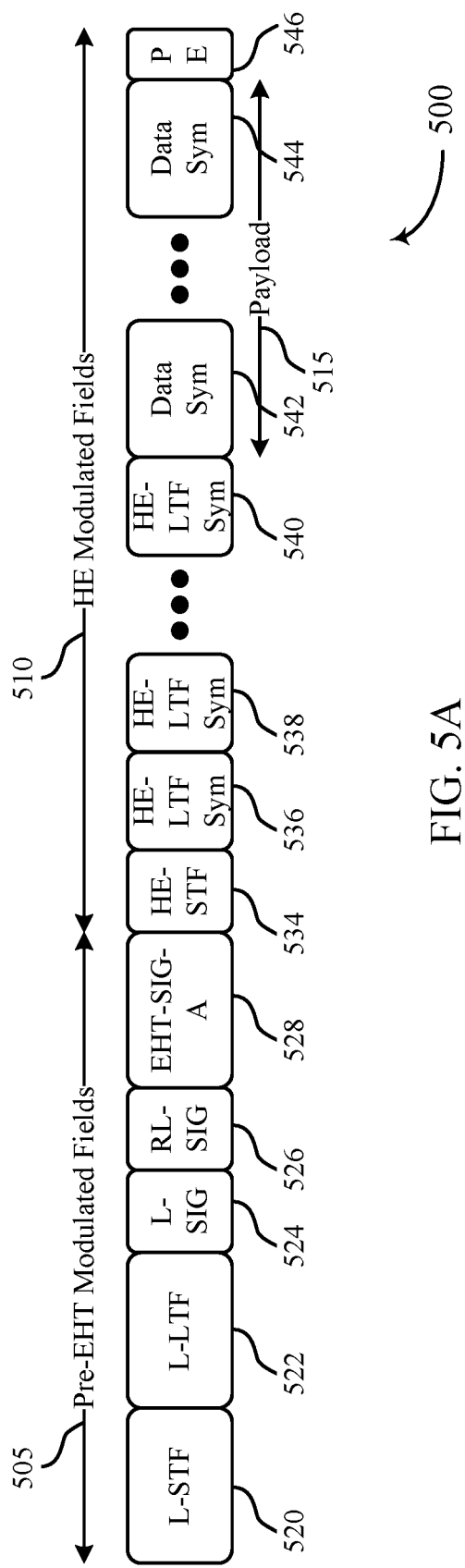
FIGS. 5A and 5B show examples of uplink field alignments for HE trigger-based PPDU fields and EHT trigger-based PPDU fields, respectively, that support orthogonal multiplexing of HE and EHT wireless traffic.
Figure 5B:
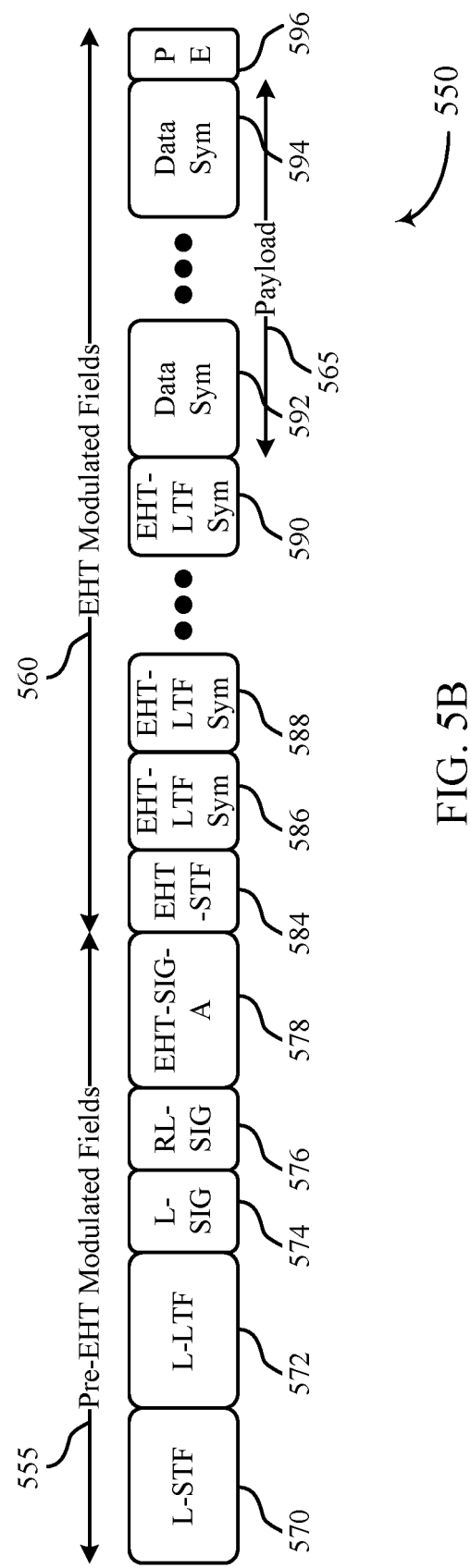

FIGS. 5A and 5B show examples of uplink field alignments 500 and 550 for HE trigger-based PPDU fields and EHT trigger-based PPDU fields, respectively, that support orthogonal multiplexing of HE and EHT wireless traffic. The example uplink field alignment 500 shows a configuration of a number of HE trigger-based PPDU fields for an HE transmission, and the example uplink field alignment 550 shows a configuration of a number of EHT trigger-based PPDU fields for an EHT transmission. In some implementations, the uplink field alignment 500 and the uplink field alignment 550 may correspond to one or both of HE and EHT transmissions using two distinct spatial transmissions streams. In some implementations, the uplink field alignment 500 and the uplink field alignment 550 may implement aspects of the trigger frame bandwidth 400, for example the trigger-based PPDU portions, as described with reference to FIG. 4. It is to be understood that while the techniques described herein may be described and illustrated with reference to HE transmissions and EHT transmissions on two respective spatial streams, the techniques may be implemented similarly for any combination of HE transmissions and EHT transmissions (for example, to configure HE transmission with respect to one or more additional HE transmissions, an EHT transmission with respect to one or more additional EHT transmissions, or any combination thereof).

As shown in FIG. 5A, the example uplink field alignment 500 includes a set of pre-EHT modulated fields 505 and a set of HE modulated fields 510 for the HE transmission, where the HE modulated fields 510 may include a payload 515 (for example, a data payload). The pre-EHT modulated fields 505 may include an L-STF 520, an L-LTF 522, an L-SIG field 524, an RL-SIG field 526, and an EHT-SIG-A field 528. In some implementations, the EHT-SIG-A field 528 may include a copy of the contents of the trigger frame (including, for example, the HE-SIG-A Reserved field), for example, as described with reference to FIG. 4. The HE modulated fields 510 may include an HE-STF 534 followed by a number of HE-LTF symbols, shown as a first HE-LTF symbol 536, a second HE-LFT symbol 538, through a third HE-LFT symbol 540. Following the third HE-LTF symbol 540 (that is, the last HE-LTF symbol), the payload 515 in the HE modulated fields 510 may include a number of data symbols, shown as a first data symbol 542 through a second data symbol 544, and a PE field 546.

As shown in FIG. 5B, the example uplink field alignment 550 includes a set of pre-EHT modulated fields 555 and a set of EHT modulated fields 560 for the EHT transmission, where the EHT modulated fields 560 may include a payload 565 (for example, a data payload). The pre-EHT modulated fields 555 may include an L-STF 570, an L-LTF 572, an L-SIG field 574, an RL-SIG field 576, and an EHT-SIG-A field 578. In some implementations, the EHT-SIG-A field 578 may include a copy of the contents of the trigger frame (including, for example, the HE-SIG-A Reserved field), for example, as described with reference to FIG. 4. The EHT modulated fields 560 may include an EHT-STF 584 followed by a number of EHT-LTF symbols, shown as a first EHT-LTF symbol 586, a second EHT-LFT symbol 588, through a third EHT-LFT symbol 590. Following the third EHT-LTF symbol 590 (that is, the last EHT-LTF symbol), the payload 565 in the EHT modulated fields 560 may include a number of data symbols, shown as a first data symbol 592 through a second data symbol 594, and a PE field 596.

To achieve orthogonality between simultaneous or substantially simultaneous HE and EHT transmissions (for example, using OFDMA), symbol boundaries of the PPDU fields shown by the uplink field alignments 500 and 550 may be aligned in time. For example, an AP may transmit a trigger frame to one or more wireless devices (such as one or more STAs) to trigger one or more uplink HE and EHT transmissions, for example, as shown in the uplink field alignment 500 and the uplink field alignment 550, respectively. In some implementations, the trigger frame may indicate to transmit an EHT preamble in addition to an HE preamble, where the EHT preamble includes the pre-EHT modulated fields 555 followed by the EHT modulated fields 560, and the HE preamble also includes pre-EHT modulated fields 505 instead of, for example, pre-HE modulated fields, followed by the HE modulated fields 510. Accordingly, an HE preamble PPDU portion and an EHT preamble PPDU portion may be received orthogonally.

In some implementations, the trigger frame may include a common information field and a per-user (that is, user-specific) information field for STAs associated with each HE and EHT PPDU. The common information field (for example, an HE-SIG-A Reserved field) may include common information particular for, for example, EHT. The per-user information field may allocate spatial streams for each HE and EHT device, and the per-user field may have an identical (or substantially identical) bit size for an equal (or substantially equal) duration for each HE or EHT device (such as a client device).

In some implementations, the pre-EHT modulated fields 505 of the HE transmission may be aligned (for example, naturally by way of same or common configuration) in a trigger-based PPDU for each RU with the pre-EHT modulated fields 555 of the EHT transmission. The HE modulated fields 510 and the EHT modulated fields 560 may be aligned in the trigger-based PPDU for each RU.

In some implementations, the HE modulated fields 510 and the EHT modulated fields 560 may be aligned in time by configuring each trigger-based PPDU portion to include a same number of HE-LTFs and EHT-LTFs, where, for example, LTFs and GIs of each of the PPDU portions may be configured with a same duration (that is, identical or substantially identical). For example, the HE modulated fields 510 may be configured with a same number of HE-LTF symbols 536-540 as a number of EHT-LTF symbols 586-590 configured in the EHT modulated fields 560. Accordingly, a duration of each symbol (such as OFDM symbols) without a GI in the HE-LTF symbols 536-540 may have a same duration as each of the symbols without a GI in the EHT-LTF symbols 586-590. Similarly, a GI duration used for the HE-LTF symbols 536-540 may be the same as a GI duration used for the EHT-LTF symbols 586-590. In some implementations, the common information field (for example, the HE-SIG-A Reserved field) of the trigger frame may indicate the respective numbers of HE LTFs and EHT LTFs and durations of the LTFs and GIs. In some implementations, HE-SFTs and EHT-STFs may have a same duration (that is, a duration of the HE-STF 534 may be the same as a duration of the EHT-STF 584).

Alternatively, in some implementations, the HE modulated fields 510 and the EHT modulated fields 560 may be aligned in time where different trigger-based PPDUs contain different numbers of HE-LTFs and EHT-LTFs (using a timing such as 4×LTFs). In some such implementations, the HE-LTFs and the EHT-LTFs, including any associated GIs, may have a same duration as a payload portion (for example, a data portion) of a corresponding HE or EHT transmission. For example, a duration of each data symbol 542-544 (such as OFDM symbols) without a GI of the HE modulated fields 510 (for example, HE data fields) may be the same as a duration of each data symbol 592-594 without a GI of the EHT modulated fields 560 (for example, EHT data fields) (a duration such as 12.8 µs), and a duration of a GI in the HE data fields may be the same as a duration of a GI of the EHT data fields (such as 0.8, 1.6, or 3.2 µs). Similarly, a duration of each symbol without a GI of the HE-LTF symbols 536-540 may be the same as a duration of each symbol without a GI in the EHT-LTF symbols 586-590 (such as 12.8 µs), and a duration of a GI may be the same for any of the HE-LTF symbols 536-540, EHT-LTF symbols 586-590, HE data symbols 542-544, and EHT data symbols 592-594.

Additionally, or alternatively, in some implementations, the payload 515 of the HE modulated fields 510 and the payload 565 of the EHT modulated fields 560 may be aligned in the trigger-based PPDU by padding one or more fields of the HE and EHT PPDU fields. Accordingly, in some implementations, the data symbols 542-544 of the HE modulated fields 510 and the data symbols 592-594 of the EHT modulated fields 560 may each include a DFT period and a GI, where the DFT periods may have a same duration (such as 12.8 µs) and the GIs may have same duration (such as 0.8, 1.6, or 3.2 µs).

Example configurations for trigger-based PPDU portion transmissions for HE and EHT are provided according to Tables 3 and 4 shown below. The configurations of Tables 3 and 4 may be implemented according to the techniques described herein. It is to be understood that the configurations provided in Tables 3 and 4 are illustrative examples, and any number of other analogous configurations may be implemented similarly.

TABLE 3

II. 160 MHz Bandwidth for Trigger-based PPDU Portions

| Trigger-based PPDU Bandwidth | Trigger-based PPDU Portions | | |
|---|---|---|---|
| 160 MHz | 40 MHz HE Trigger-based PPDU | 40 MHz HE Trigger-based PPDU | 80 MHz EHT Trigger-based PPDU |
| 160 MHz | 80 MHz HE Trigger-based PPDU | | 80 MHz EHT Trigger-based PPDU |

TABLE 4

III. 320 MHz Bandwidth for Trigger-based PPDU Portions

| Trigger-based PPDU Bandwidth | Trigger-based PPDU Portions | | | |
|---|---|---|---|---|
| 320 MHz | 80 MHz HE Trigger-based PPDU | 80 MHz HE Trigger-based PPDU | 80 MHz EHT Trigger-based PPDU | 80 MHz EHT Trigger-based PPDU |
| 320 MHz | 80 MHz HE Trigger-based PPDU | 80 MHz EHT Trigger-based PPDU | 160 MHz EHT Trigger-based PPDU | |
| 320 MHz | 160 MHz HE Trigger-based PPDU | | 160 MHz EHT Trigger-based PPDU | |

Figure 6:
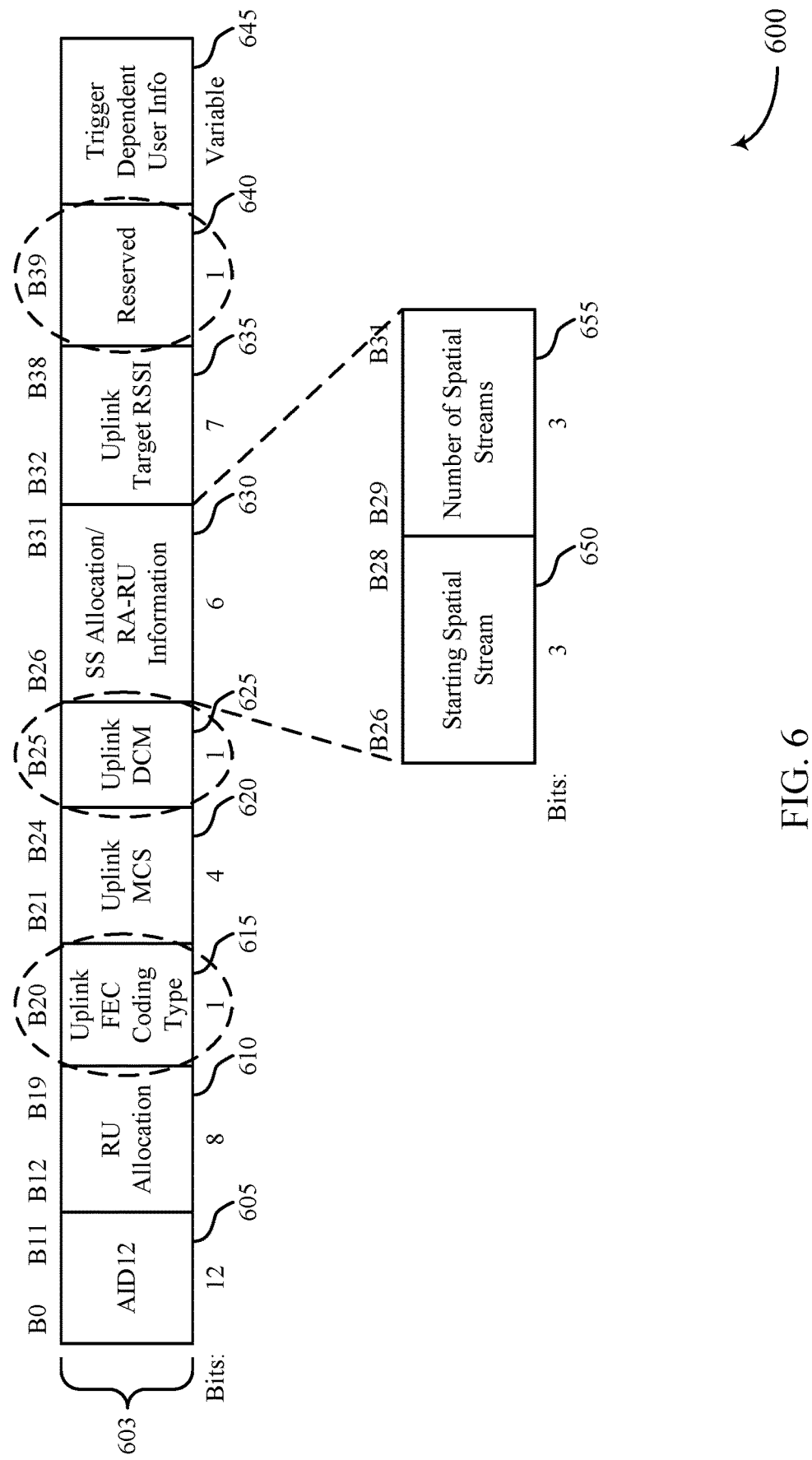
FIG. 6 shows an example of a trigger frame that supports orthogonal multiplexing of HE and EHT wireless traffic.

FIG. 6 shows an example of a trigger frame 600 that supports orthogonal multiplexing of HE and EHT wireless traffic. The trigger frame 600 shows an example configuration for a per-user information field 603 including per-user (that is, user-specific) configuration information for an AP to communicate EHT transmissions with one or more respective STAs (such as EHT devices), as described herein. The per-user information field 603 shown in the trigger frame 600 may include one or more subfields (or, generally, additional fields) that may be configurable to indicate various parameters. For example, each of the subfields may include one or more bits that that may be configurable to indicate a value or set of values for a corresponding parameter. In some implementations, a subfield may further include one or more additional subfields (i.e., sub-subfields) that may similarly include a set of bits configurable to indicate various parameters. It is to be understood that while the trigger frame 600 is described herein with reference to EHT transmissions, a similar frame may be configured for HE transmissions with the STAs (such as HE devices). In some implementations, the per-user information field 603 may allocate spatial streams resources for each EHT and HE device with which an AP may communicate.

As shown in FIG. 6, the per-user information field 603 of the example trigger frame 600 includes nine subfields, each subfield configurable to indicate one or more parameters (such as parameters specific to a particular STA) for communicating the associated EHT PPDU portion. Each subfield may include a bit or a set of bits that indicate a value for the corresponding parameter or parameters, as may be configured for the respective subfield.

For example, a first subfield 605 of the per-user information field 603 may be configured as an association identification (AID) subfield (for example, an AID12 subfield). The first subfield 605 may include 12 bits (for example, from a B0 bit through a B11 bit). A second subfield 610 of the per-user information field 603 may be configured as an RU allocation subfield. The second subfield 610 may include eight bits (for example, from a B12 bit through a B19 bit). A third subfield 615 of the per-user information field 603 may be configured as a coding type subfield, for example, an uplink forward error correction (FEC) coding type subfield (for example, an UL FEC Coding Type subfield). The third subfield 615 may include one bit (for example, a B20 bit). A fourth subfield 620 of the per-user information field 603 may be configured as an uplink modulation and coding scheme (MCS) subfield (for example, an UL MCS subfield). The fourth subfield 620 may include four bits (for example, from a B21 bit through a B24 bit). A fifth subfield 625 of the per-user information field 603 may be configured as an uplink dual-carrier modulation (DCM) subfield (for example, an UL DCM subfield). The fifth subfield 625 may include one bit (for example, a B25 bit).

A sixth subfield 630 of the per-user information field 603 may be configured for a spatial stream and resource allocation information subfield (for example, an SS Allocation/RA-RU Information subfield). The sixth subfield 630 may include six bits (for example, from a B26 bit through a B31 bit). In some implementations, the sixth subfield 630 may include two sub-subfields, for example, a first sub-subfield 650 indicating a starting spatial stream (including, for example, three bits from the B26 bit through a B28 bit) and a second sub-subfield 655 indicating a number of spatial streams (including, for example, three bits from a B29 bit through the B31 bit). A seventh subfield 635 of the per-user information field 603 may be configured as an uplink target received signal strength indicator (RSSI) field (for example, an UL Target RSSI subfield). The seventh subfield 635 may include seven bits (for example, from a B32 bit through a B38 bit). An eighth subfield 640 of the per-user information field 603 may be reserved for additional configurations (for example, a Reserved subfield). The eighth subfield 640 may include one bit (for example, a B39 bit). A ninth subfield 645 of the per-user information field 603 may be configured for trigger-dependent user information. The ninth subfield 645 may include a variable number of bits, for example, depending on the particular information to be configured.

In some implementations (such as for communications using a bandwidth of 160 MHz), a trigger frame RU allocation table may be eight bits, for example, as may be indicated in the second subfield 610 configured as the RU allocation subfield. Of the eight bits, a first bit (which may be represented by B) may indicate whether the RU allocation is a primary configuration (for example, a P80 configuration for 80 MHz) or a secondary configuration (for example, an S80 configuration for 80 MHz). The remaining seven bits of the second subfield 610 may be used to indicate an RU allocation index corresponding to a particular RU allocation (for example, according to a mapping, such as those provided in example Tables 5 and 6 below).

In other implementations (such as for EHT communications using a bandwidth of 320 MHz), the trigger frame RU allocation table may similarly be eight bits, for example, as may be indicated in the second subfield 610 configured as the RU allocation subfield. Of the eight bits, a first bit (for example, represented by B) may indicate whether the RU allocation is a primary configuration (for example, a P160 configuration for 160 MHz) or a secondary configuration (for example, an S160 configuration for 160 MHz). The remaining seven bits of the second subfield 610 may be used to indicate an RU allocation index corresponding to a particular RU allocation (for example, according a mapping, such as those provided in example Tables 5 and 6 below). In some such implementations (such as for EHT communications), the mapping for the RU allocation may be reused or shared in common with other implementations (such as legacy communications protocols, such as a legacy Wi-Fi protocol).

These seven bits of the second subfield 610, for example, each having a binary value, may indicate a value for the RU allocation index between 0 and 127. This value may correspond to a particular RU allocation, for example, according to the Tables 5 and 6 shown below. That is, Tables 5 and 6 show example RU allocation mappings for bandwidths of 160 MHz and 320 MHz, respectively, but various other like RU allocation mapping may be similarly implemented according to the techniques described herein. In some implementations, for example, as shown below in Tables 5 and 6, a 26-tone RU allocation may be used with a 160 MHz bandwidth but may not be used with a 320 MHz bandwidth.

TABLE 5

RU Allocation Subfield for 160 MHz Bandwidth for Uplink OFDMA Transmissions according to Bits B19-B13 of a Trigger Frame

| B19-B13 | Description | Number of Entries |
|---|---|---|
| 0-36 | Possible 26-tone RU instances in 80 MHz | 37 |
| 37-52 | Possible 52-tone RU instances in 80 MHz | 16 |
| 53-60 | Possible 106-tone RU instances in 80 MHz | 8 |
| 61-64 | Possible 242-tone RU instances in 80 MHz | 4 |
| 65-66 | Possible 484-tone RU instances in 80 MHz | 2 |
| 67 | Possible 996-tone RU instances in 80 MHz | 1 |
| 68 | A 2*996 tone RU instance | 1 |
| 69-127 | Reserved | 59 |
| Total | | 128 |

TABLE 6

RU Allocation Subfield for 320 MHz Bandwidth for Uplink OFDMA Transmissions according to Bits B19 through B13 of a Trigger Frame

| B19-B13 | Description | Number of Entries |
|---|---|---|
| 0-31 | Possible 52-tone RU instances in 160 MHz | 32 |
| 32-47 | Possible 106-tone RU instances in 160 MHz | 16 |
| 48-55 | Possible 242-tone RU instances in 160 MHz | 8 |
| 56-59 | Possible 484-tone RU instances in 160 MHz | 4 |
| 60-61 | Possible 996-tone RU instances in 160 MHz | 2 |
| 62 | Possible 2*996-tone RU instance in 160 MHz | 1 |
| 63 | 2*2*996 tone RU instance | 1 |
| 64-127 | Reserved | 64 |
| Total | | 128 |

Returning to the example trigger frame 600 shown in FIG. 6, the per-user information field 603 may indicate a spatial stream allocation, for example, for up to 16 spatial streams. In some implementations (such as for EHT communications, as described herein), eight bits of the per-user information field 603 may be used for a spatial stream allocation subfield. That is, a spatial stream allocation subfield for EHT may have a bit width of eight bits, although these eight bits may or may not be contiguous. For example, four bits may be used to indicate a starting spatial stream, and four bits may be used to indicate a number of spatial streams.

In some implementations, one or more subfields may be repurposed for such an EHT spatial stream allocation subfield. For example, as represented by the three circled subfields in the example trigger frame 600 of FIG. 6, two of the one-bit subfields may be repurposed for the EHT spatial stream allocation subfield. For example, the third subfield 615 (as may be configured as an uplink FEC coding type subfield) including the B20 bit, the fifth subfield 625 (as may be configured as an uplink DCM subfield) including the B25 bit, and the eighth subfield 640 (as may be configured as a reserved subfield) including the B39 bit may be repurposed for use as the EHT spatial stream allocation subfield. Thus, in combination with the six bits already configured for the EHT spatial stream allocation subfield, a total of nine bits of the per-user information field 603 may be made available for the EHT spatial stream allocation subfield. Thus, of the three one-bit subfields, any two may be combined with the six bits of the sixth subfield already configured for spatial stream allocations to indicate the EHT spatial stream allocation subfield. In some implementations, a single coding type or DCM may be assumed, for example, if the corresponding third subfield 615 or fifth subfield 625 are repurposed. According to the techniques described herein, an AP may support up to 16 spatial streams (such as different transmission streams using non-overlapping or orthogonal spatial resources) for trigger-based PPDU transmissions using EHT.

Figure 7:
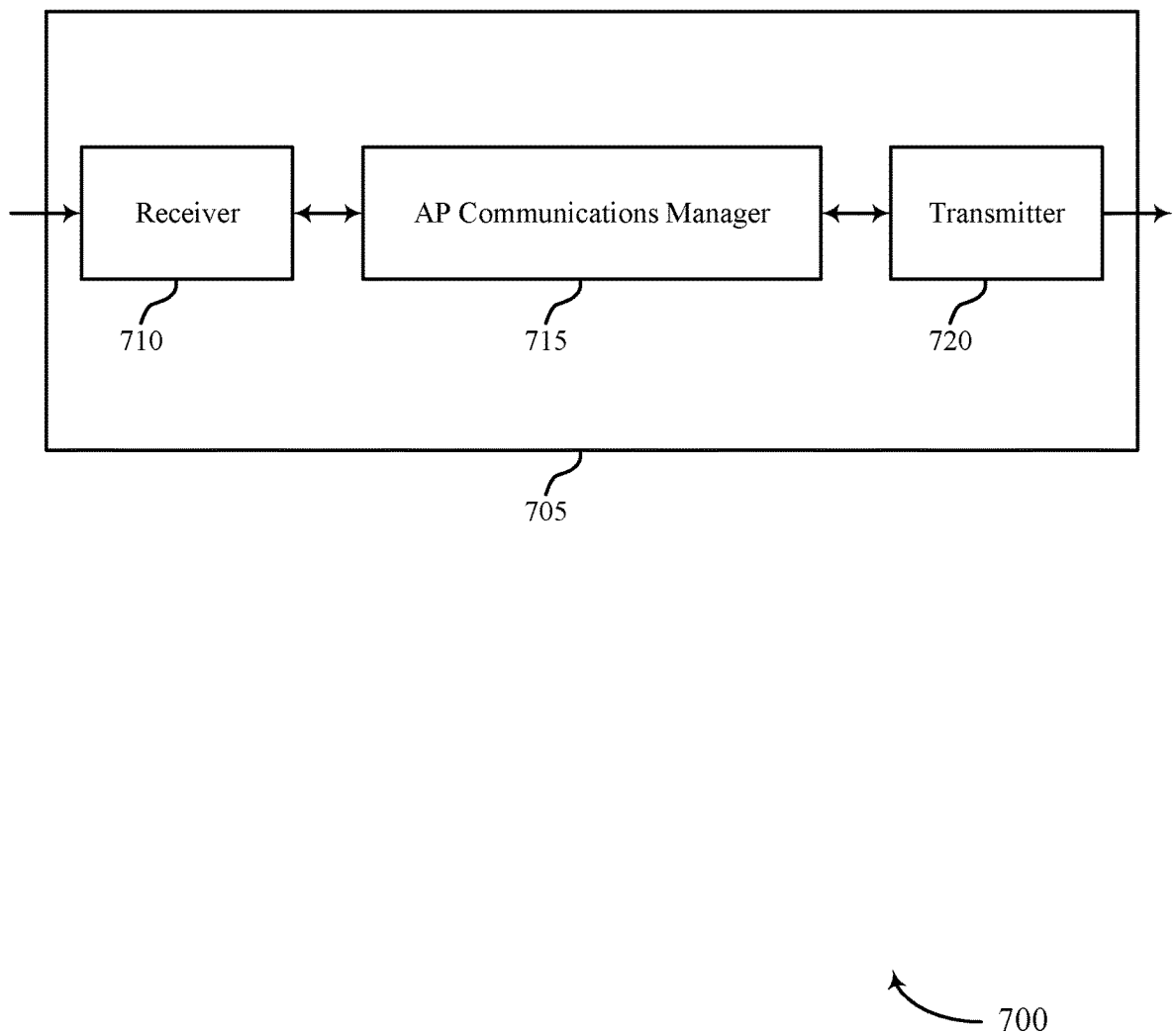
FIGS. 7 and 8 show block diagrams of devices that support orthogonal multiplexing of HE and EHT wireless traffic.

FIG. 7 shows a block diagram 700 of a device 705 that supports orthogonal multiplexing of HE and EHT wireless traffic. The device 705 may be an example of aspects of an AP 105 as described herein. The device 705 may include a receiver 710, an AP communications manager 715, and a transmitter 720. The device 705 also may include a processor. Each of these components may be in communication with one another (such as via one or more buses).

The receiver 710 may receive information such as packets, user data, or control information associated with various information channels (such as control channels, data channels, and information related to orthogonal multiplexing of HE and EHT wireless traffic, etc.). Information may be passed on to other components of the device. The receiver 710 may be an example of aspects of the transceiver 1020 described with reference to FIG. 10. The receiver 710 may utilize a single antenna or a set of antennas.

The AP communications manager 715 may align a set of first pre-modulated fields of a first PPDU portion in time with a set of second pre-modulated fields of a second preamble PPDU portion, where the first pre-modulated fields and the second pre-modulated fields may each include one or more of pre-HE modulated fields or pre-EHT modulated fields, and the first preamble PPDU portion and the second preamble PPDU portion may each include one or more of an HE preamble PPDU portion or an EHT preamble PPDU portion. Additionally, the AP communications manager 715 may align a set of first modulated fields of the first preamble PPDU portion in time with a set of second modulated fields of the second preamble PPDU portion, where the first modulated fields and the second modulate fields may each include one or more of HE modulated fields or EHT modulated fields. In some implementations, the AP communications manager 715 may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion may be transmitted orthogonally to the second preamble PPDU portion.

Additionally, or alternatively, the AP communications manager 715 may transmit a trigger frame over a total bandwidth of the AP. The AP communications manager 715 may receive, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion may each include one or more of an HE preamble PPDU portion or an EHT preamble PPDU portion. In some implementations, the first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion, where the first pre-modulated fields and the second pre-modulated fields may each include one or more of pre-HE modulated fields or pre-EHT modulated fields, and the first modulated fields and the second modulate fields may each include one or more of HE modulated fields or EHT modulated fields. The AP communications manager 715 may be an example of aspects of the AP communications manager 1010.

The actions performed by the AP communications manager 715 as described herein may be implemented to realize one or more potential advantages discussed herein. One implementation may allow the AP to substantially simultaneously transmit HE and EHT communications with multiple STAs (such as with HE devices and EHT devices, respectively). The techniques disclosed in this paper facilitate the AP to align the analogous portions of HE and EHT transmissions in time such that orthogonality between the two types of transmissions may be maintained. In this way, the AP may conserve spectral resources due to the substantially simultaneous transmissions. As such, the techniques described herein may facilitate the coexistence of, for example, different types of STAs operating according to different protocols on different system bandwidths (such as HE devices and EHT devices). This may provide for latency improvements in the wireless communications system as the AP and STAs of the system may not wait to transmit a second type of transmission after a first transmission. Further, because of the orthogonality between transmissions facilitated by the techniques described herein, the AP may reliably communicate substantially simultaneously with multiple different types of STAs without, for example, switching between different signaling protocols or formats.

The transmitter 720 may transmit signals generated by other components of the device. In some implementations, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

A processing system of the wireless communication device 705 may perform various functions such as functions or tasks supporting ranging protocol improvements for antenna switching. A processing system may generally refer to a system or series of machines or components that receives inputs and processes the inputs to produce a set of outputs (which may be passed to other systems or components of, for example, the wireless communication device 705). For example, a processing system of the wireless communication device 705 may refer to a system including the AP communications manager 715 and, in some cases, various other components or subcomponents of the wireless communication device 705. The processing system may receive, process, and output information (such as information related to ranging protocol improvements for antenna switching).

The processing system of the wireless communication device 705 may interface with other components of the wireless communication device 705, and may process information received from other components (such as inputs or signals), output information to other components, etc. For example, a chip or modem of the wireless communication device 705 may include a processing system, a first interface to output information, and a second interface to receive information. In some cases, the first interface may refer to an interface between the processing system of the chip or modem and the transmitter 720, such that the wireless communication device 705 may transmit information output from the chip or modem. In some cases, the second interface may refer to an interface between the processing system of the chip or modem and the receiver 710, such that the wireless communication device 705 may receive information or signal inputs, and the information may be passed to the processing system.

Figure 8:
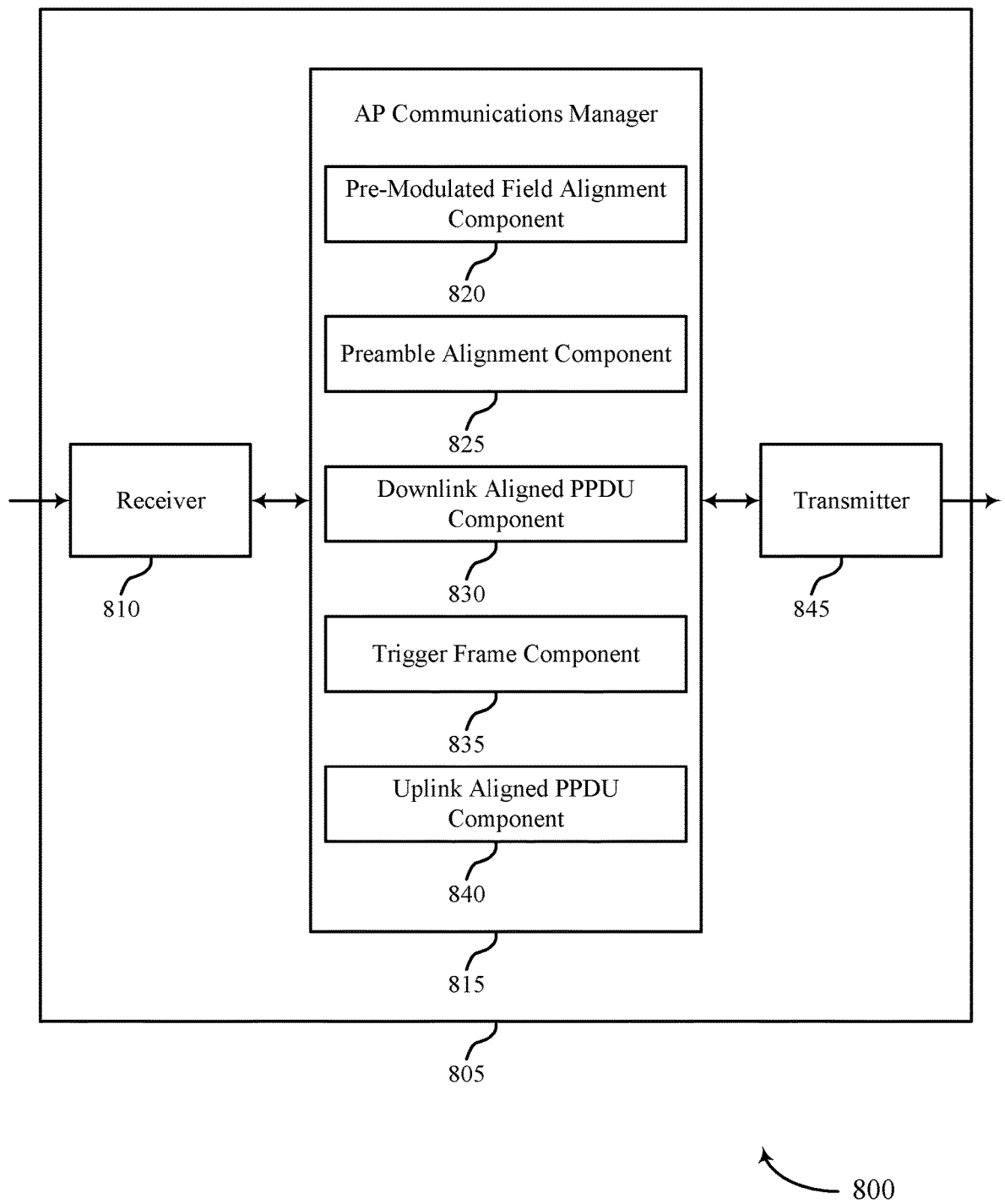

FIG. 8 shows a block diagram 800 of a device 805 that supports orthogonal multiplexing of HE and EHT wireless traffic. The device 805 may be an example of aspects of a device 705 or an AP 105 as described herein. The device 805 may include a receiver 810, an AP communications manager 815, and a transmitter 845. The device 805 also may include a processor. Each of these components may be in communication with one another (such as via one or more buses).

The receiver 810 may receive information such as packets, user data, or control information associated with various information channels (such as control channels, data channels, and information related to orthogonal multiplexing of HE and EHT wireless traffic, etc.). Information may be passed on to other components of the device. The receiver 810 may be an example of aspects of the transceiver 1020 described with reference to FIG. 10. The receiver 810 may utilize a single antenna or a set of antennas.

The AP communications manager 815 may be an example of aspects of the AP communications manager 715 as described herein. The AP communications manager 815 may include a pre-modulated field alignment component 820, a preamble alignment component 825, a downlink aligned PPDU component 830, a trigger frame component 835, and an uplink aligned PPDU component 840. The AP communications manager 815 may be an example of aspects of the AP communications manager 1010 described herein.

The pre-modulated field alignment component 820 may align a set of first pre-modulated fields of a first PPDU portion in time with a set of second pre-modulated fields of a second preamble PPDU portion, where the first pre-modulated fields and the second pre-modulated fields may each include one or more of pre-HE modulated fields or pre-EHT modulated fields, and the first preamble PPDU portion and the second preamble PPDU portion may each include one or more of an HE preamble PPDU portion or an EHT preamble PPDU portion.

The preamble alignment component 825 may align a set of first modulated fields of the first preamble PPDU portion in time with a set of second modulated fields of the second preamble PPDU portion, where the first modulated fields and the second modulate fields may each include one or more of HE modulated fields or EHT modulated fields.

The downlink aligned PPDU component 830 may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion may be transmitted orthogonally to the second preamble PPDU portion.

In some implementations, the actions performed by the downlink aligned PPDU component 830, included in the AP communications manager 815, as described herein may facilitate the processor 1040, as described with reference to FIG. 10, to more efficiently cause the device 805 to perform various functions. For example, the device 805 may substantially simultaneously transmit HE and EHT communications with multiple STAs (such as with HE devices and EHT devices, respectively) with which the device 805 is communicating. Accordingly, the device 805 may conserve spectral resources, and may relatively reduce power consumption due to a relatively lower amount of time that the device 805 is transmitting, as compared to, for example, consecutively transmitting different types of communications to the different types of receiving devices. This may reduce processing complexity for the processor of the device 805, and may allow the device 805 to consume less power for a period of time that the device 805 may not need to communicate due to the simultaneous transmission, thus reducing processing power consumption for the processor of the device 805.

The trigger frame component 835 may transmit a trigger frame over a total bandwidth of the AP.

The uplink aligned PPDU component 840 may receive, in response to the trigger frame, a transmission including a first PPDU portion and a second preamble PPDU portion, the first preamble PPDU portion occupying a different portion of the total bandwidth than the second preamble PPDU portion during the transmission, where the first preamble PPDU portion and the second preamble PPDU portion may each include one or more of HE preamble PPDU portion or an EHT preamble PPDU portion. In some implementations, the first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion, and where the first pre-modulated fields and the second pre-modulated fields may each include one or more of pre-HE modulated fields or pre-EHT modulated fields, and the first modulated fields and the second modulate fields may each include one or more of HE modulated fields or EHT modulated fields.

The transmitter 845 may transmit signals generated by other components of the device. In some implementations, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
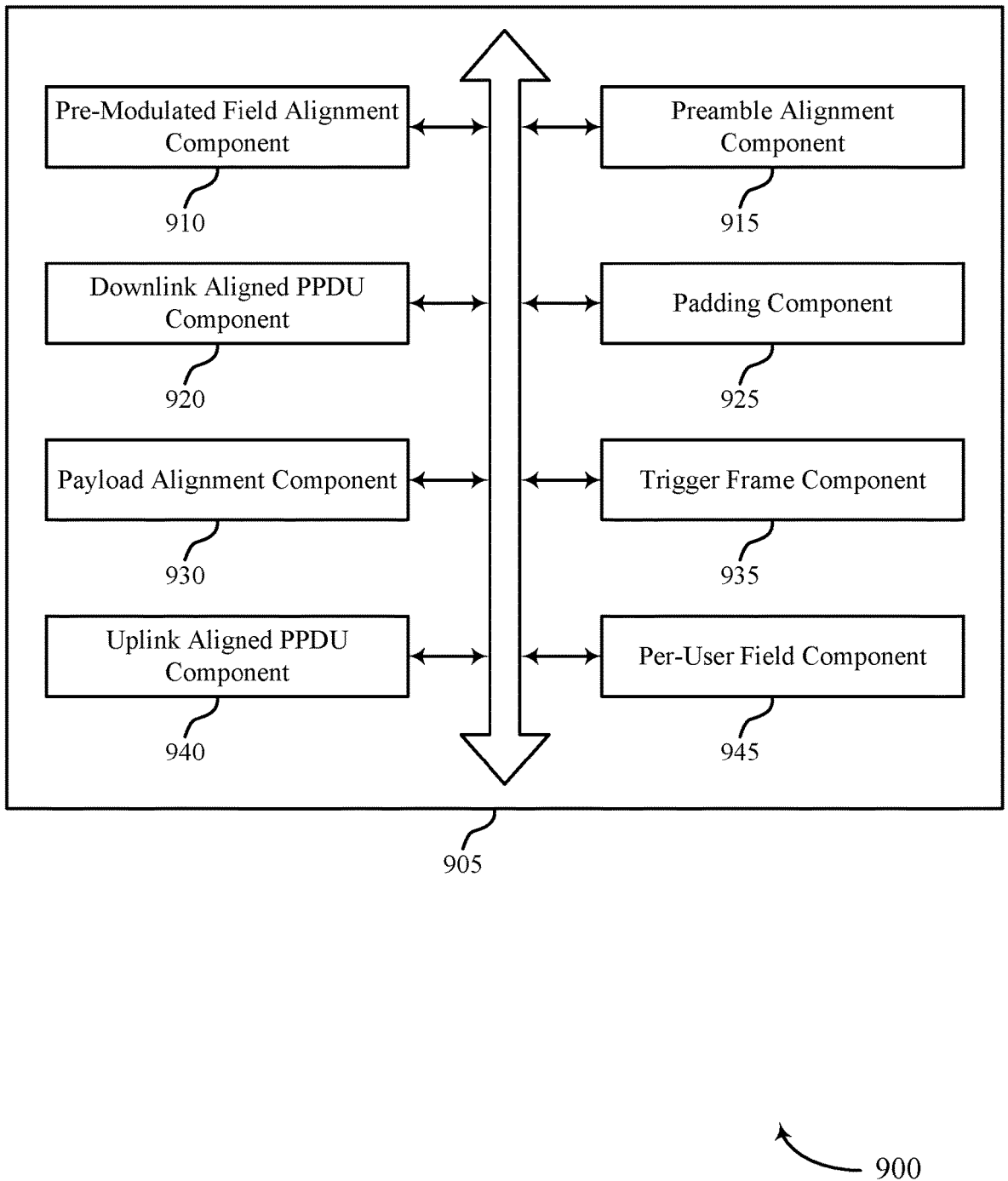
FIG. 9 shows a block diagram of an AP communications manager that supports orthogonal multiplexing of HE and EHT wireless traffic.

FIG. 9 shows a block diagram 900 of an AP communications manager 905 that supports orthogonal multiplexing of HE and EHT wireless traffic. The AP communications manager 905 may be an example of aspects of an AP communications manager 715, an AP communications manager 815, or an AP communications manager 1010 described herein. The AP communications manager 905 may include a pre-modulated field alignment component 910, a preamble alignment component 915, a downlink aligned PPDU component 920, a padding component 925, a payload alignment component 930, a trigger frame component 935, an uplink aligned PPDU component 940, and a per-user field component 945. Each of these modules may communicate, directly or indirectly, with one another (such as via one or more buses).

The pre-modulated field alignment component 910 may align a set of first pre-modulated fields of a first PPDU portion in time with a set of second pre-modulated fields of a second preamble PPDU portion, where the first pre-modulated fields and the second pre-modulated fields may each include one or more of pre-HE modulated fields or pre-EHT modulated fields, and the first preamble PPDU portion and the second preamble PPDU portion may each include one or more of an HE preamble PPDU portion or an EHT preamble PPDU portion.

The preamble alignment component 915 may align a set of first modulated fields of the first preamble PPDU portion in time with a set of second modulated fields of the second preamble PPDU portion, where the first modulated fields and the second modulate fields may each include one or more of HE modulated fields or EHT modulated fields. In some implementations, the first preamble PPDU portion and the second preamble PPDU portion may include one or more of an equal number of long training fields, a same OFDM symbol duration, or a same GI duration. Additionally, a number of long training fields of the first preamble PPDU portion may be different from a number of long training fields of the second preamble PPDU portion, and the long training fields of the first preamble PPDU portion or the second preamble PPDU portion may use a same OFDM symbol duration and a same GI duration as a payload of the first preamble PPDU portion or the second preamble PPDU portion.

The downlink aligned PPDU component 920 may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion may be transmitted orthogonally to the second preamble PPDU portion.

The trigger frame component 935 may transmit a trigger frame over a total bandwidth of the AP.

The uplink aligned PPDU component 940 may receive, in response to the trigger frame, a transmission including a first PPDU portion and a second preamble PPDU portion, the first preamble PPDU portion occupying a different portion of the total bandwidth than the second preamble PPDU portion during the transmission, where the first preamble PPDU portion and the second preamble PPDU portion may each include one or more of HE preamble PPDU portion or an EHT preamble PPDU portion. In some implementations, the first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion, and where the first pre-modulated fields and the second pre-modulated fields may each include one or more of pre-HE modulated fields or pre-EHT modulated fields, and the first modulated fields and the second modulate fields may each include one or more of HE modulated fields or EHT modulated fields.

Additionally, the first preamble PPDU portion and the second preamble PPDU portion include one or more of an equal number of long training fields, a same OFDM symbol duration, or a same GI duration. In some implementations, a number of long training fields of the first preamble PPDU portion may be different from a number of long training fields of the second preamble PPDU portion, and the long training fields of the first preamble PPDU portion or the second preamble PPDU portion may use a same OFDM symbol duration and a same GI duration as a payload of the first preamble PPDU portion or the second preamble PPDU portion. Additionally, a payload of the first preamble PPDU portion may be aligned in time with a payload of the second preamble PPDU portion.

The padding component 925 may pad a SIG-B field of the first preamble PPDU portion or the second preamble PPDU portion such that a duration of the set of first pre-modulated fields of the first preamble PPDU portion may be the same as a duration of the set of second pre-modulated fields of the second preamble PPDU portion.

The payload alignment component 930 may align a payload of the first preamble PPDU portion in time with a payload of the second preamble PPDU portion. In some implementations, aligning the payload of the first preamble PPDU portion in time with the payload of the second preamble PPDU portion may include padding one or more of the payload of the first preamble PPDU portion or the payload of the second preamble PPDU portion.

The per-user field component 945 may generate a per-user information field corresponding to each of a first wireless station associated with the first preamble PPDU portion and a second wireless station associated with the second preamble PPDU portion, where the per-user information field corresponding to the first wireless station may be equal in duration to the per-user information field corresponding to the second wireless station, and the per-user information field for each of the first wireless station and the second wireless station may be included in the trigger frame. In some implementations, the per-user information field may indicate spatial stream allocation information for each of the first wireless station and the second wireless station, and the spatial stream allocation information may be signaled in a combination of a spatial stream allocation subfield and one or more of an uplink forward error correction coding type subfield, an uplink dual carrier modulation subfield, or a reserved subfield.

Figure 10:
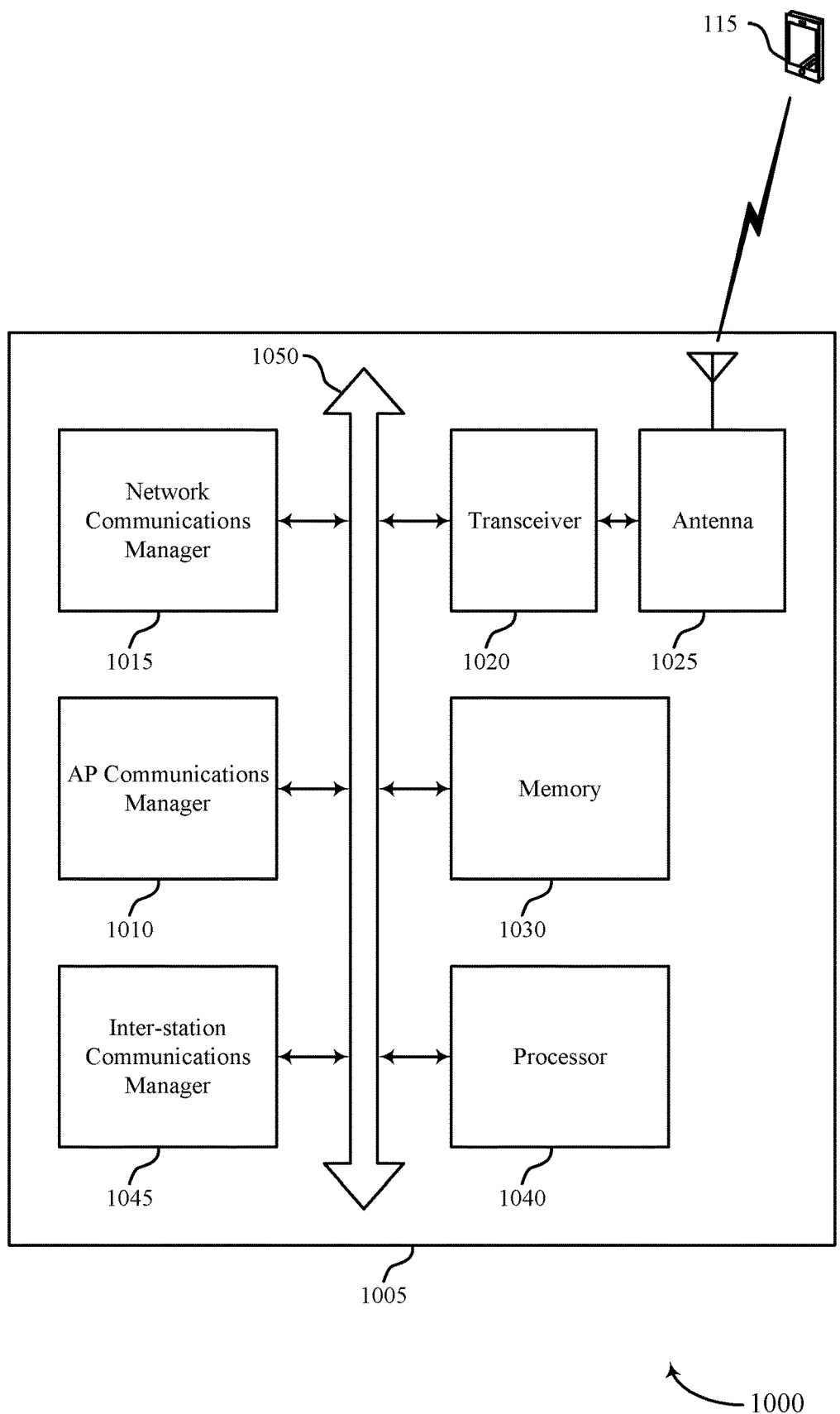
FIG. 10 shows a diagram of a system including a device that supports orthogonal multiplexing of HE and EHT wireless traffic.

FIG. 10 shows a diagram of a system 1000 including a device 1005 that supports orthogonal multiplexing of HE and EHT wireless traffic. The device 1005 may be an example of or include the components of device 705, device 805, or an AP 105 as described herein. The device 1005 may include components for bi-directional voice and data communications including components for transmitting and receiving communications, including an AP communications manager 1010, a network communications manager 1015, a transceiver 1020, an antenna 1025, memory 1030, a processor 1040, and an inter-station communications manager 1045. These components may be in electronic communication via one or more buses (such as bus 1050).

The AP communications manager 1010 may align a set of first pre-modulated fields of a first PPDU portion in time with a set of second pre-modulated fields of a second preamble PPDU portion, where the first pre-modulated fields and the second pre-modulated fields may each include one or more of pre-HE modulated fields or pre-EHT modulated fields, and the first preamble PPDU portion and the second preamble PPDU portion may each include one or more of an HE preamble PPDU portion or an EHT preamble PPDU portion. Additionally, the AP communications manager 1010 may align a set of first modulated fields of the first preamble PPDU portion in time with a set of second modulated fields of the second preamble PPDU portion, where the first modulated fields and the second modulate fields may each include one or more of HE modulated fields or EHT modulated fields. The AP communications manager 1010 may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion may be transmitted orthogonally to the second preamble PPDU portion.

Additionally, or alternatively, the AP communications manager 1010 may transmit a trigger frame over a total bandwidth of the AP. The AP communications manager 1010 may receive, in response to the trigger frame, a transmission including a first PPDU portion and a second preamble PPDU portion, the first preamble PPDU portion occupying a different portion of the total bandwidth than the second preamble PPDU portion during the transmission, where the first preamble PPDU portion and the second preamble PPDU portion may each include one or more of HE preamble PPDU portion or an EHT preamble PPDU portion. In some implementations, the first preamble PPDU portion may be received orthogonally to the second preamble PPDU portion, a set of first pre-modulated fields of the first preamble PPDU portion may be aligned in time with a set of second pre-modulated fields of the second preamble PPDU portion, and a set of first modulated fields of the first preamble PPDU portion may be aligned in time with a set of second modulated fields of the second preamble PPDU portion, and where the first pre-modulated fields and the second pre-modulated fields may each include one or more of pre-HE modulated fields or pre-EHT modulated fields, and the first modulated fields and the second modulate fields may each include one or more of HE modulated fields or EHT modulated fields.

The network communications manager 1015 may manage communications with the core network (such as via one or more wired backhaul links). For example, the network communications manager 1015 may manage the transfer of data communications for client devices, such as one or more STAs 115.

The transceiver 1020 may communicate bi-directionally, via one or more antennas, wired, or wireless links as described above. In some implementations, the wireless device may include a single antenna 1025. However, in some implementations the device may have more than one antenna 1025, which may be capable of concurrently transmitting or receiving multiple wireless transmissions.

The memory 1030 may store computer-readable, computer-executable code 1035 including instructions that, when executed, cause the processor to perform various functions described herein. In some implementations, the memory 1030 may contain, among other things, a basic input/output system (BIOS) which may control basic hardware or software operation such as the interaction with peripheral components or devices.

The processor 1040 may be configured to execute computer-readable instructions stored in a memory to perform various functions (such as functions or tasks supporting orthogonal multiplexing of HE and EHT wireless traffic).

The inter-station communications manager 1045 may manage communications with other APs 105 and may include a controller or scheduler for controlling communications with STAs 115 in cooperation with other APs 105. For example, the inter-station communications manager 1045 may coordinate scheduling for transmissions to STAs 115 for various interference mitigation techniques such as beamforming or joint transmission. In some implementations, the inter-station communications manager 1045 may provide an X2 interface within an LTE/LTE-A wireless communications network technology to provide communication between APs 105.

Figure 11:
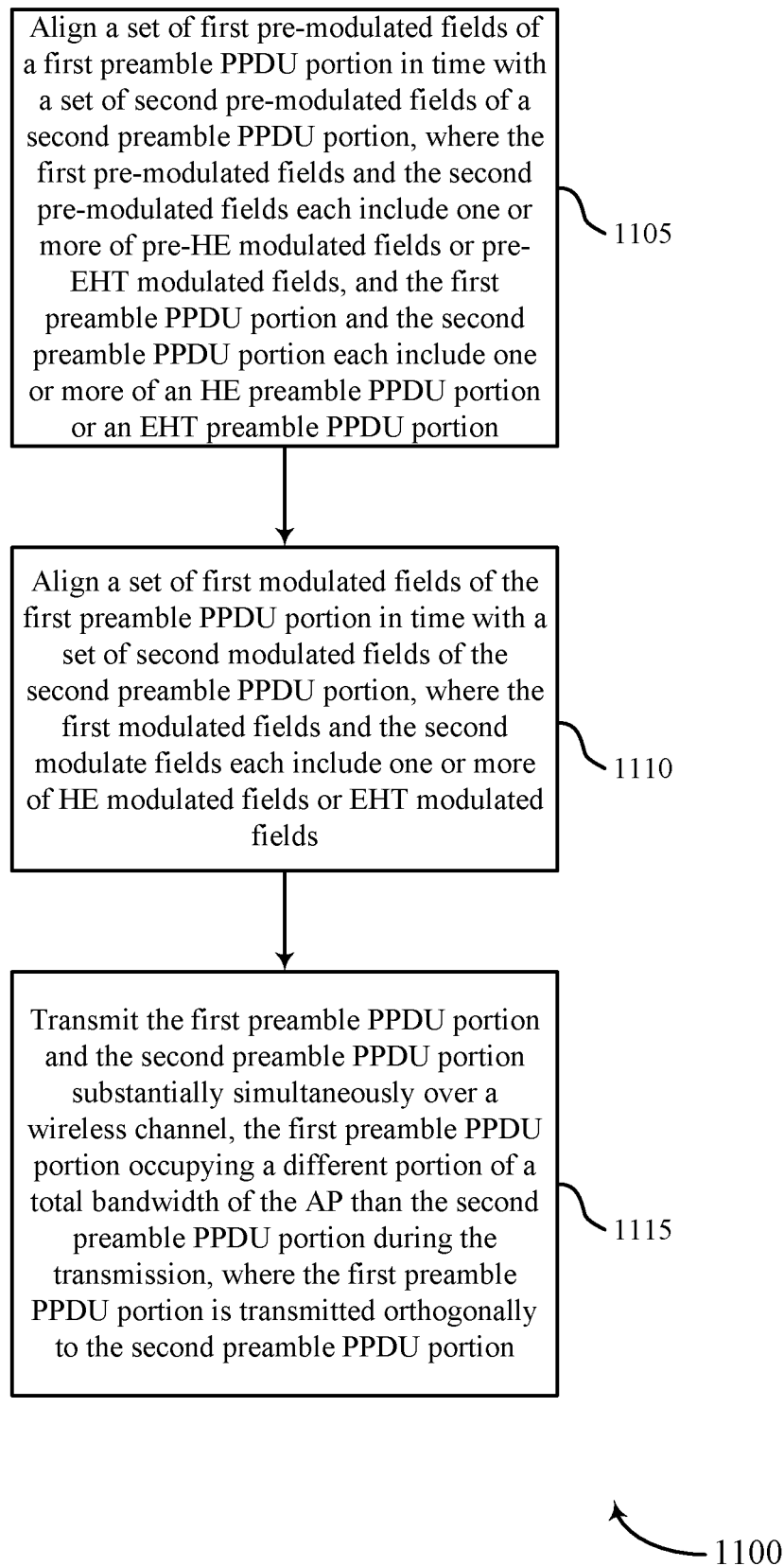
FIGS. 11-14 show flowcharts illustrating methods that support orthogonal multiplexing of HE and EHT wireless traffic.

FIG. 11 shows a flowchart illustrating a method 1100 that supports orthogonal multiplexing of HE and EHT wireless traffic. The operations of method 1100 may be implemented by an AP 105 or its components as described herein. For example, the operations of method 1100 may be performed by an AP communications manager as described with reference to FIGS. 7-10. In some implementations, an AP may execute a set of instructions to control the functional elements of the AP to perform the functions described below. Additionally, or alternatively, an AP may perform aspects of the functions described below using special-purpose hardware.

At 1105, the AP may align a set of first pre-modulated fields of a first preamble PPDU portion in time with a set of second pre-modulated fields of a second preamble PPDU portion, where the first pre-modulated fields and the second pre-modulated fields each include one or more of pre-HE modulated fields or pre-EHT modulated fields, and the first preamble PPDU portion and the second preamble PPDU portion each include one or more of an HE preamble PPDU portion or an EHT preamble PPDU portion. The operations of 1105 may be performed according to the methods described herein. In some implementations, aspects of the operations of 1105 may be performed by a pre-modulated field alignment component as described with reference to FIGS. 7-10.

At 1110, the AP may align a set of first modulated fields of the first preamble PPDU portion in time with a set of second modulated fields of the second preamble PPDU portion, where the first modulated fields and the second modulate fields each include one or more of HE modulated fields or EHT modulated fields. The operations of 1110 may be performed according to the methods described herein. In some implementations, aspects of the operations of 1110 may be performed by a preamble alignment component as described with reference to FIGS. 7-10.

At 1115, the AP may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion. The operations of 1115 may be performed according to the methods described herein. In some implementations, aspects of the operations of 1115 may be performed by a downlink aligned PPDU component as described with reference to FIGS. 7-10.

Figure 12:
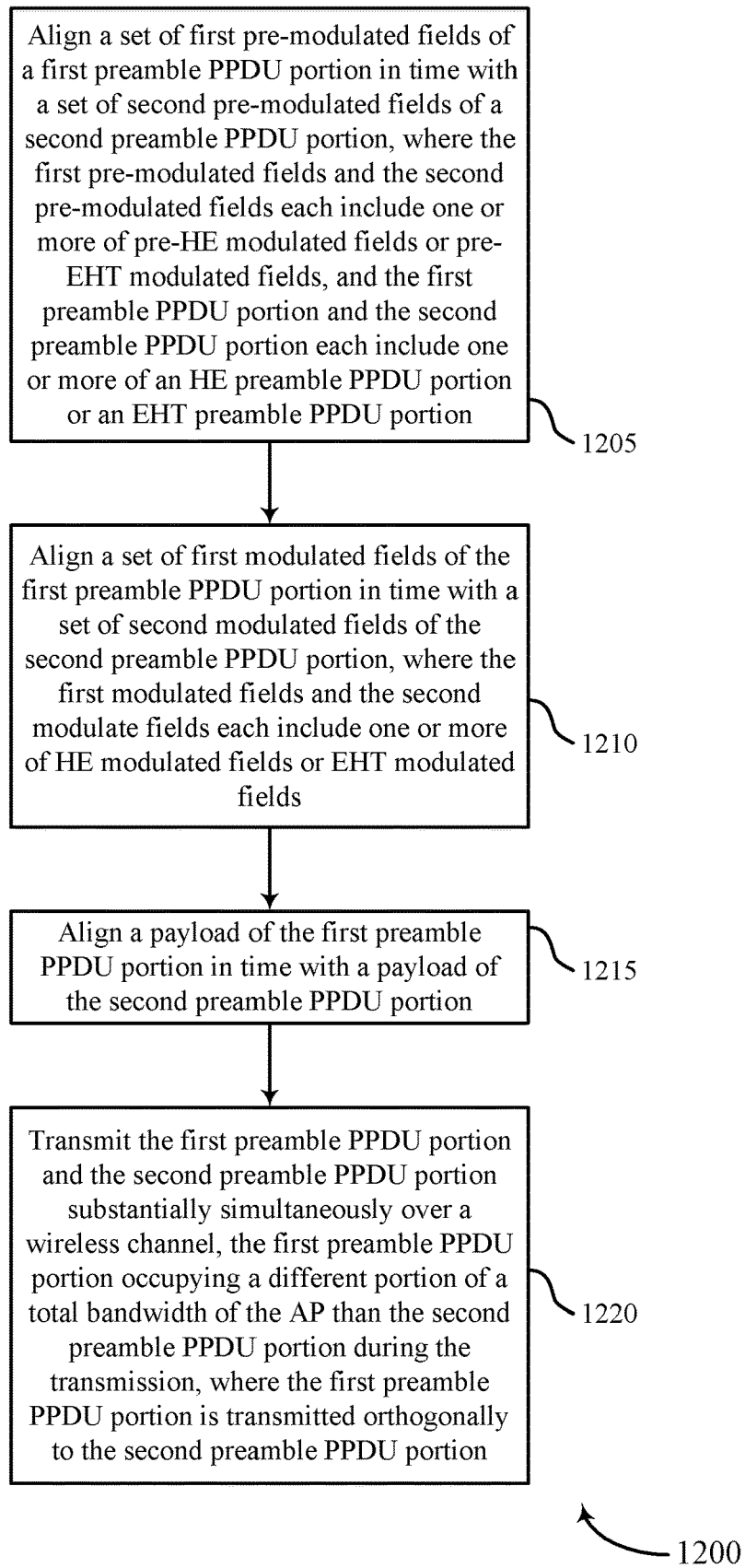

FIG. 12 shows a flowchart illustrating a method 1200 that supports orthogonal multiplexing of HE and EHT wireless traffic. The operations of method 1200 may be implemented by an AP 105 or its components as described herein. For example, the operations of method 1200 may be performed by an AP communications manager as described with reference to FIGS. 7-10. In some implementations, an AP may execute a set of instructions to control the functional elements of the AP to perform the functions described below. Additionally, or alternatively, an AP may perform aspects of the functions described below using special-purpose hardware.

At 1205, the AP may align a set of first pre-modulated fields of a first preamble PPDU portion in time with a set of second pre-modulated fields of a second preamble PPDU portion, where the first pre-modulated fields and the second pre-modulated fields each include one or more of pre-HE modulated fields or pre-EHT modulated fields, and the first preamble PPDU portion and the second preamble PPDU portion each include one or more of an HE preamble PPDU portion or an EHT preamble PPDU portion. The operations of 1205 may be performed according to the methods described herein. In some implementations, aspects of the operations of 1205 may be performed by a pre-modulated field alignment component as described with reference to FIGS. 7-10.

At 1210, the AP may align a set of first modulated fields of the first preamble PPDU portion in time with a set of second modulated fields of the second preamble PPDU portion, where the first modulated fields and the second modulate fields each include one or more of HE modulated fields or EHT modulated fields. The operations of 1210 may be performed according to the methods described herein. In some implementations, aspects of the operations of 1210 may be performed by a preamble alignment component as described with reference to FIGS. 7-10.

At 1215, the AP may align a payload of the first preamble PPDU portion in time with a payload of the second preamble PPDU portion. The operations of 1215 may be performed according to the methods described herein. In some implementations, aspects of the operations of 1215 may be performed by a payload alignment component as described with reference to FIGS. 7-10.

At 1220, the AP may transmit the first preamble PPDU portion and the second preamble PPDU portion substantially simultaneously over a wireless channel, the first preamble PPDU portion occupying a different portion of a total bandwidth of the AP than the second preamble PPDU portion during the transmission, where the first preamble PPDU portion is transmitted orthogonally to the second preamble PPDU portion. The operations of 1220 may be performed according to the methods described herein. In some implementations, aspects of the operations of 1220 may be performed by a downlink aligned PPDU component as described with reference to FIGS. 7-10.

Figure 13:
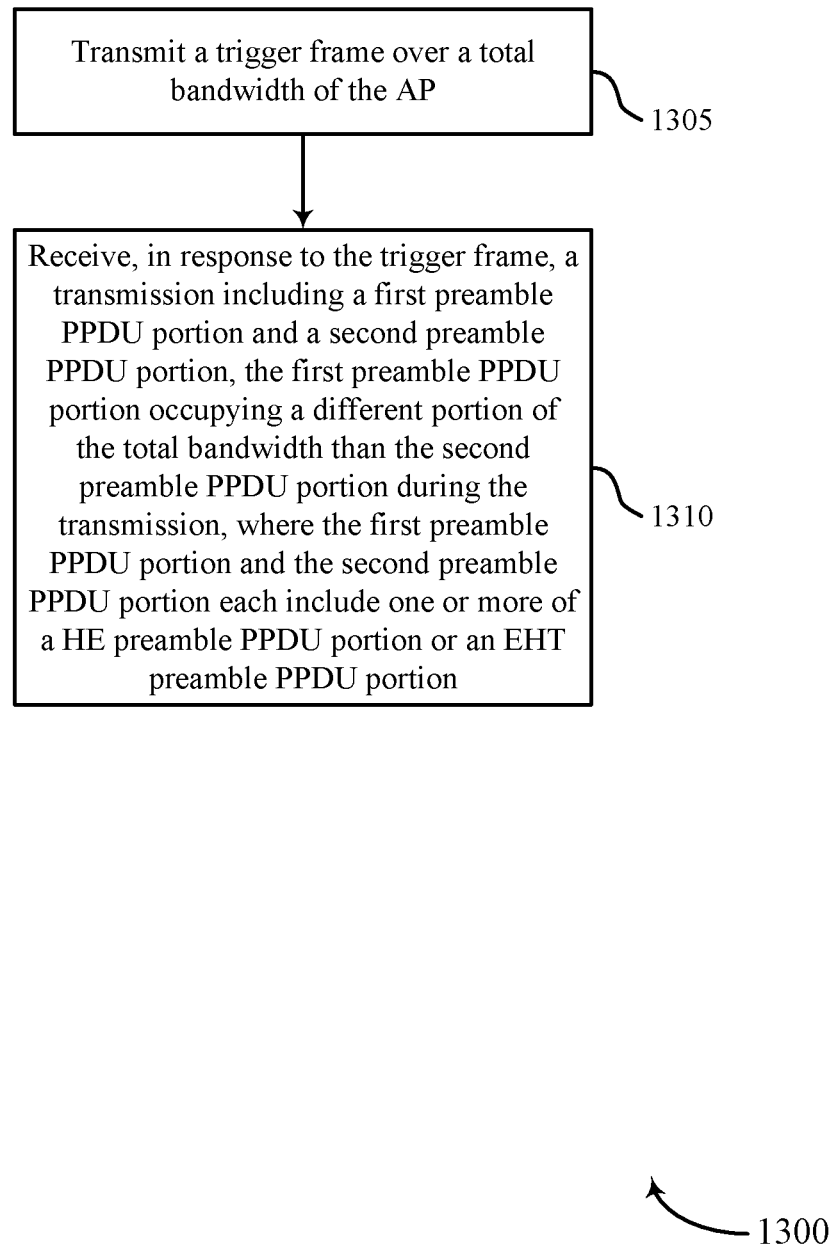

FIG. 13 shows a flowchart illustrating a method 1300 that supports orthogonal multiplexing of HE and EHT wireless traffic. The operations of method 1300 may be implemented by an AP 105 or its components as described herein. For example, the operations of method 1300 may be performed by an AP communications manager as described with reference to FIGS. 7-10. In some implementations, an AP may execute a set of instructions to control the functional elements of the AP to perform the functions described below. Additionally, or alternatively, an AP may perform aspects of the functions described below using special-purpose hardware.

At 1305, the AP may transmit a trigger frame over a total bandwidth of the AP. The operations of 1305 may be performed according to the methods described herein. In some implementations, aspects of the operations of 1305 may be performed by a trigger frame component as described with reference to FIGS. 7-10.

At 1310, the AP may receive, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. In some implementations, the first preamble PPDU portion may be received orthogonally to the second preamble PPDU portion, a set of first pre-modulated fields of the first preamble PPDU portion is aligned in time with a set of second pre-modulated fields of the second preamble PPDU portion, and a set of first modulated fields of the first preamble PPDU portion is aligned in time with a set of second modulated fields of the second preamble PPDU portion, and where the first pre-modulated fields and the second pre-modulated fields each include one or more of pre-HE modulated fields or pre-EHT modulated fields, and the first modulated fields and the second modulate fields each include one or more of HE modulated fields or EHT modulated fields. The operations of 1310 may be performed according to the methods described herein. In some implementations, aspects of the operations of 1310 may be performed by an uplink aligned PPDU component as described with reference to FIGS. 7-10.

Figure 14:
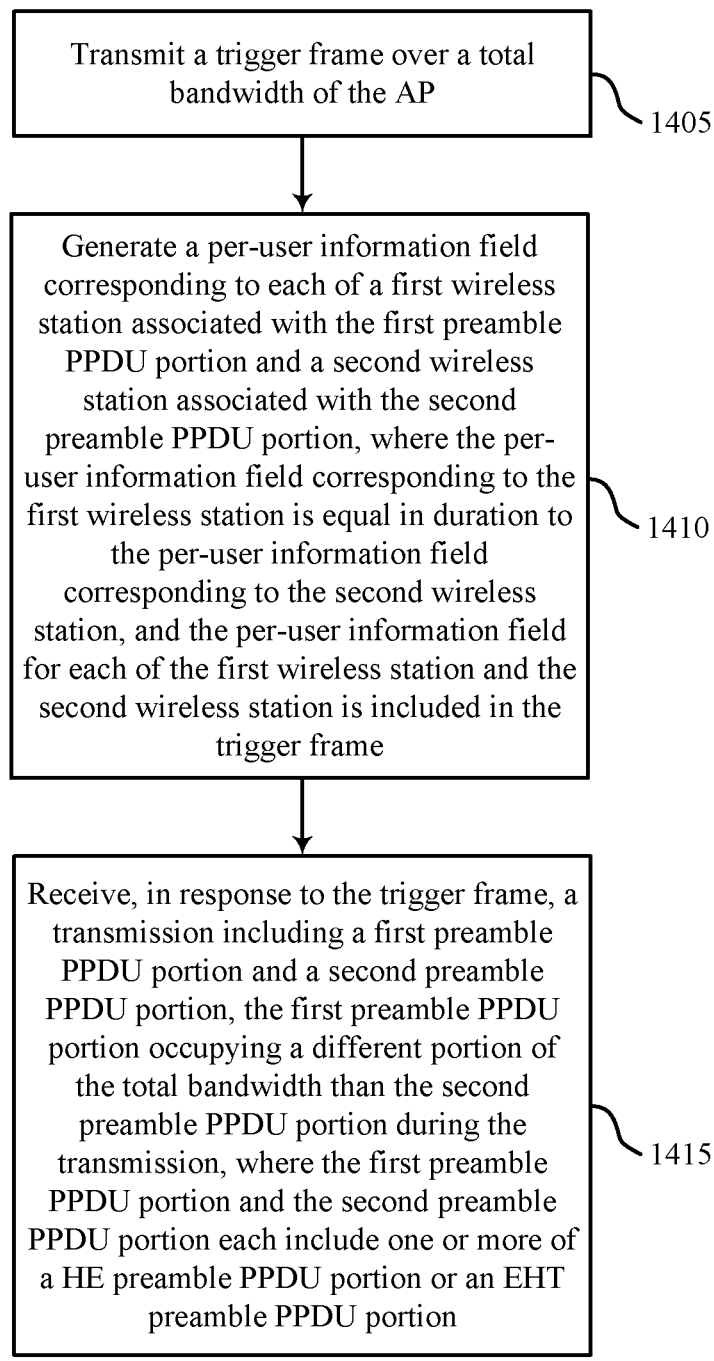

FIG. 14 shows a flowchart illustrating a method 1400 that supports orthogonal multiplexing of HE and EHT wireless traffic. The operations of method 1400 may be implemented by an AP 105 or its components as described herein. For example, the operations of method 1400 may be performed by an AP communications manager as described with reference to FIGS. 7-10. In some implementations, an AP may execute a set of instructions to control the functional elements of the AP to perform the functions described below. Additionally, or alternatively, an AP may perform aspects of the functions described below using special-purpose hardware.

At 1405, the AP may transmit a trigger frame over a total bandwidth of the AP. The operations of 1405 may be performed according to the methods described herein. In some implementations, aspects of the operations of 1405 may be performed by a trigger frame component as described with reference to FIGS. 7-10.

At 1410, the AP may generate a per-user information field corresponding to each of a first wireless station associated with the first preamble PPDU portion and a second wireless station associated with the second preamble PPDU portion, where the per-user information field corresponding to the first wireless station is equal in duration to the per-user information field corresponding to the second wireless station, and the per-user information field for each of the first wireless station and the second wireless station is included in the trigger frame. The operations of 1410 may be performed according to the methods described herein. In some implementations, aspects of the operations of 1410 may be performed by a per-user field component as described with reference to FIGS. 7-10.

At 1415, the AP may receive, in response to the trigger frame, a transmission including a first preamble PPDU portion and a second preamble PPDU portion, the first preamble PPDU portion occupying a different portion of the total bandwidth than the second preamble PPDU portion during the transmission, where the first preamble PPDU portion and the second preamble PPDU portion each include one or more of an HE preamble PPDU portion or an EHT preamble PPDU portion. In some implementations, the first preamble PPDU portion may be received orthogonally to the second preamble PPDU portion, a set of first pre-modulated fields of the first preamble PPDU portion is aligned in time with a set of second pre-modulated fields of the second preamble PPDU portion, and a set of first modulated fields of the first preamble PPDU portion is aligned in time with a set of second modulated fields of the second preamble PPDU portion, and where the first pre-modulated fields and the second pre-modulated fields each include one or more of pre-HE modulated fields or pre-EHT modulated fields, and the first modulated fields and the second modulate fields each include one or more of HE modulated fields or EHT modulated fields. The operations of 1415 may be performed according to the methods described herein. In some implementations, aspects of the operations of 1415 may be performed by an uplink aligned PPDU component as described with reference to FIGS. 7-10.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communications media including any medium that can be enabled to transfer a computer program from one place to another. A storage media may be any available media that may be accessed by a computer. By way of example, and not limitation, such computer-readable media may include random-access memory (RAM), read-only memory (ROM), electrically erasable programmable ROM (EEPROM), compact disc ROM (CD-ROM) or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at an access point (AP), comprising:
   a first interface;
   a processing system configured to:
   align a set of first pre-modulated fields of a first preamble physical protocol data unit (PPDU) portion in time with a set of second pre-modulated fields of a second preamble PPDU portion, wherein the first pre-modulated fields and the second pre-modulated fields each include one or more of pre-high efficiency (HE) modulated fields or pre-extremely high throughput (EHT) modulated fields, and the first preamble PPDU portion and the second preamble PPDU portion each include one or more of an HE preamble PPDU portion or an EHT preamble PPDU portion;
   align a set of first modulated fields of the first preamble PPDU portion in time with a set of second modulated fields of the second preamble PPDU portion, wherein the first modulated fields and the second modulate fields each include one or more of HE modulated fields or EHT modulated fields; and
   output, over the first interface for transmission to a wireless device, the first preamble PPDU portion and the second preamble PPDU portion substantially simultaneously over a wireless channel, the first preamble PPDU portion occupying a different portion of a total bandwidth of the AP than the second preamble PPDU portion during the transmission, wherein the first preamble PPDU portion is transmitted orthogonally to the second preamble PPDU portion.

2. The apparatus of claim 1, wherein the processing system is further configured to:
   pad a signal B (SIG-B) field of the first preamble PPDU portion or the second preamble PPDU portion such that a duration of the set of first pre-modulated fields of the first preamble PPDU portion is the same as a duration of the set of second pre-modulated fields of the second preamble PPDU portion.

3. The apparatus of claim 1, wherein the processing system is further configured to:
   align a payload of the first preamble PPDU portion in time with a payload of the second preamble PPDU portion.

4. The apparatus of claim 3, wherein:
   aligning the payload of the first preamble PPDU portion in time with the payload of the second preamble PPDU portion includes padding one or more of the payload of the first preamble PPDU portion or the payload of the second preamble PPDU portion.

5. The apparatus of claim 1, wherein:
   the first preamble PPDU portion and the second preamble PPDU portion include one or more of an equal number of long training fields, a same orthogonal frequency-division multiplexing (OFDM) symbol duration, or a same guard interval (GI) duration.

6. The apparatus of claim 1, wherein:
   a number of long training fields of the first preamble PPDU portion is different from a number of long training fields of the second preamble PPDU portion, and the long training fields of the first preamble PPDU portion or the second preamble PPDU portion use a same orthogonal frequency-division multiplexing (OFDM) symbol duration and a same guard interval (GI) duration as a payload of the first preamble PPDU portion or the second preamble PPDU portion.

7. An apparatus for wireless communications at an access point (AP), comprising:
   a first interface;
   a second interface;
   a processing system configured to:
   output, over the first interface for transmission to a wireless device, a trigger frame over a total bandwidth of the AP; and
   obtain over the second interface a transmission received in response to the trigger frame, the transmission including a first preamble physical protocol data unit (PPDU) portion and a second preamble PPDU portion, the first preamble PPDU portion occupying a different portion of the total bandwidth than the second preamble PPDU portion during the transmission, wherein the first preamble PPDU portion and the second preamble PPDU portion each include one or more of a high efficiency (HE) preamble PPDU portion or an extremely high throughput (EHT) preamble PPDU portion, and
   wherein the first preamble PPDU portion is received orthogonally to the second preamble PPDU portion, a set of first pre-modulated fields of the first preamble PPDU portion is aligned in time with a set of second pre-modulated fields of the second preamble PPDU portion, and a set of first modulated fields of the first preamble PPDU portion is aligned in time with a set of second modulated fields of the second preamble PPDU portion, and wherein the first pre-modulated fields and the second pre-modulated fields each include one or more of pre-HE modulated fields or pre-EHT modulated fields, and the first modulated fields and the second modulate fields each include one or more of HE modulated fields or EHT modulated fields.

8. The apparatus of claim 7, wherein
   the first preamble PPDU portion and the second preamble PPDU portion include one or more of an equal number of long training fields, a same orthogonal frequency-division multiplexing (OFDM) symbol duration, or a same guard interval (GI) duration.

9. The apparatus of claim 7, wherein:
   a number of long training fields of the first preamble PPDU portion is different from a number of long training fields of the second preamble PPDU portion, and the long training fields of the first preamble PPDU portion or the second preamble PPDU portion use a same orthogonal frequency-division multiplexing (OFDM) symbol duration and a same guard interval (GI) duration as a payload of the first preamble PPDU portion or the second preamble PPDU portion.

10. The apparatus of claim 7, wherein:
a payload of the first preamble PPDU portion is aligned in time with a payload of the second preamble PPDU portion.

11. The apparatus of claim 7, wherein the processing system is further configured to:
generate a per-user information field corresponding to each of a first wireless station associated with the first preamble PPDU portion and a second wireless station associated with the second preamble PPDU portion, wherein the per-user information field corresponding to the first wireless station is equal in duration to the per-user information field corresponding to the second wireless station, and the per-user information field for each of the first wireless station and the second wireless station is included in the trigger frame.

12. The apparatus of claim 11, wherein
the per-user information field indicates spatial stream allocation information for each of the first wireless station and the second wireless station, and the spatial stream allocation information is signaled in a combination of a spatial stream allocation subfield and one or more of an uplink forward error correction coding type subfield, an uplink dual carrier modulation subfield, or a reserved subfield.

13. A method for wireless communications at an access point (AP), comprising:
aligning a set of first pre-modulated fields of a first preamble physical protocol data unit (PPDU) portion in time with a set of second pre-modulated fields of a second preamble PPDU portion, wherein the first pre-modulated fields and the second pre-modulated fields each include one or more of pre-high efficiency (HE) modulated fields or pre-extremely high throughput (EHT) modulated fields, and the first preamble PPDU portion and the second preamble PPDU portion each include one or more of an HE preamble PPDU portion or an EHT preamble PPDU portion;
aligning a set of first modulated fields of the first preamble PPDU portion in time with a set of second modulated fields of the second preamble PPDU portion, wherein the first modulated fields and the second modulate fields each include one or more of HE modulated fields or EHT modulated fields; and
transmitting the first preamble PPDU portion and the second preamble PPDU portion substantially simultaneously over a wireless channel, the first preamble PPDU portion occupying a different portion of a total bandwidth of the AP than the second preamble PPDU portion during the transmission, wherein the first preamble PPDU portion is transmitted orthogonally to the second preamble PPDU portion.

14. The method of claim 13, wherein aligning the set of first pre-modulated fields of the first preamble PPDU portion in time with the set of second pre-modulated fields of the second preamble PPDU portion includes:
padding a signal B (SIG-B) field of the first preamble PPDU portion or the second preamble PPDU portion such that a duration of the set of first pre-modulated fields of the first preamble PPDU portion is the same as a duration of the set of second pre-modulated fields of the second preamble PPDU portion.

15. The method of claim 13, wherein aligning the set of first modulated fields of the first preamble PPDU portion in time with the set of second modulated fields of the second preamble PPDU portion further comprises:
aligning a payload of the first preamble PPDU portion in time with a payload of the second preamble PPDU portion.

16. The method of claim 15, wherein:
aligning the payload of the first preamble PPDU portion in time with the payload of the second preamble PPDU portion includes padding one or more of the payload of the first preamble PPDU portion or the payload of the second preamble PPDU portion.

17. The method of claim 13, wherein:
the first preamble PPDU portion and the second preamble PPDU portion include one or more of: an equal number of long training fields, a same orthogonal frequency-division multiplexing (OFDM) symbol duration, or a same guard interval (GI) duration.

18. The method of claim 13, wherein:
a number of long training fields of the first preamble PPDU portion is different from a number of long training fields of the second preamble PPDU portion, and the long training fields of the first preamble PPDU portion or the second preamble PPDU portion use a same orthogonal frequency-division multiplexing (OFDM) symbol duration and a same guard interval (GI) duration as a payload of the first preamble PPDU portion or the second preamble PPDU portion.

19. A method for wireless communications at an access point (AP), comprising:
transmitting a trigger frame over a total bandwidth of the AP; and
receiving, in response to the trigger frame, a transmission including a first preamble physical protocol data unit (PPDU) portion and a second preamble PPDU portion, the first preamble PPDU portion occupying a different portion of the total bandwidth than the second preamble PPDU portion during the transmission, wherein the first preamble PPDU portion and the second preamble PPDU portion each include one or more of a high efficiency (HE) preamble PPDU portion or an extremely high throughput (EHT) preamble PPDU portion, and
wherein the first preamble PPDU portion is received orthogonally to the second preamble PPDU portion, a set of first pre-modulated fields of the first preamble PPDU portion is aligned in time with a set of second pre-modulated fields of the second preamble PPDU portion, and a set of first modulated fields of the first preamble PPDU portion is aligned in time with a set of second modulated fields of the second preamble PPDU portion, and wherein the first pre-modulated fields and the second pre-modulated fields each include one or more of pre-HE modulated fields or pre-EHT modulated fields, and the first modulated fields and the second modulate fields each include one or more of HE modulated fields or EHT modulated fields.

20. The method of claim 19, wherein:
the first preamble PPDU portion and the second preamble PPDU portion include one or more of: an equal number of long training fields, a same orthogonal frequency-division multiplexing (OFDM) symbol duration, or a same guard interval (GI) duration.

21. The method of claim 19, wherein:
a number of long training fields of the first preamble PPDU portion is different from a number of long training fields of the second preamble PPDU portion, and the long training fields of the first preamble PPDU portion or the second preamble PPDU portion use a same orthogonal frequency-division multiplexing (OFDM) symbol duration and a same guard interval (GI) duration as a payload of the first preamble PPDU portion or the second preamble PPDU portion.

22. The method of claim 19, wherein:
a payload of the first preamble PPDU portion is aligned in time with a payload of the second preamble PPDU portion.

23. The method of claim 19, further comprising:
generating a per-user information field corresponding to each of a first wireless station associated with the first preamble PPDU portion and a second wireless station associated with the second preamble PPDU portion, wherein the per-user information field corresponding to the first wireless station is equal in duration to the per-user information field corresponding to the second wireless station, and the per-user information field for each of the first wireless station and the second wireless station is included in the trigger frame.

24. The method of claim 23, wherein:
the per-user information field indicates spatial stream allocation information for each of the first wireless station and the second wireless station, and the spatial stream allocation information is signaled in a combination of a spatial stream allocation subfield and one or more of: an uplink forward error correction coding type subfield, an uplink dual carrier modulation subfield, or a reserved subfield.

\* \* \* \* \*